US012510858B2

(12) United States Patent
Ito et al.

(10) Patent No.: US 12,510,858 B2
(45) Date of Patent: Dec. 30, 2025

(54) IMAGE FORMING APPARATUS

(71) Applicant: CANON KABUSHIKI KAISHA, Tokyo (JP)

(72) Inventors: Shingo Ito, Tokyo (JP); Masahiro Suetsugu, Kanagawa (JP); Keitaro Nakata, Shizuoka (JP); Takuya Oka, Kanagawa (JP); Hisashi Taniguchi, Shizuoka (JP); Shimpei Ishikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/796,495

(22) Filed: Aug. 7, 2024

(65) Prior Publication Data

US 2025/0068113 A1 Feb. 27, 2025

(30) Foreign Application Priority Data

Aug. 25, 2023 (JP) ................................ 2023-137506

(51) Int. Cl.
*G03G 15/08* (2006.01)
*G03G 15/00* (2006.01)

(52) U.S. Cl.
CPC ....... *G03G 15/556* (2013.01); *G03G 15/0865* (2013.01); *G03G 15/50* (2013.01)

(58) Field of Classification Search
CPC ... G03G 15/0865; G03G 15/50; G03G 15/556
USPC ................................................ 399/9, 24, 27
See application file for complete search history.

(56) References Cited

U.S. PATENT DOCUMENTS

| | | | | |
|---|---|---|---|---|
| 11,126,110 | B2 * | 9/2021 | Hayashi | G03G 15/0889 |
| 11,796,937 | B2 * | 10/2023 | Shimizu | G03G 15/0862 |

FOREIGN PATENT DOCUMENTS

| | | | |
|---|---|---|---|
| JP | H09-244340 | A | 9/1997 |
| JP | 2005-208339 | A | 8/2005 |
| JP | 2010-276765 | A | 12/2010 |
| JP | 2020-154302 | A | 9/2020 |

OTHER PUBLICATIONS

Yuichiro Hirata et al., U.S. Appl. No. 18/798,899, filed Aug. 9, 2024.
Keitaro Nakata et al., U.S. Appl. No. 18/772,688, filed Jul. 15, 2024.

* cited by examiner

*Primary Examiner* — Hoan H Tran
(74) *Attorney, Agent, or Firm* — VENABLE LLP

(57) ABSTRACT

Provided is an image forming apparatus, including: an accommodation chamber for developer; a photosensitive drum; notification unit for making a notification to a user, and a control unit for controlling the notification unit. A replenishment container for developer is detachably attached to the accommodation chamber. The notification unit makes a first notification indicating that a developer amount in the accommodation chamber is a first state, a second notification indicating that the developer amount is a second state smaller than in the first state, and a third notification indicating that the developer amount is a third state smaller than in the second state. The image forming apparatus is capable of operating in a first mode and a second mode. The notification unit makes the notifications in an order of the first, second, and third notifications as consumption of the developer progresses.

13 Claims, 18 Drawing Sheets

Low

Mid

Full

FIG. 15A
(Amended)
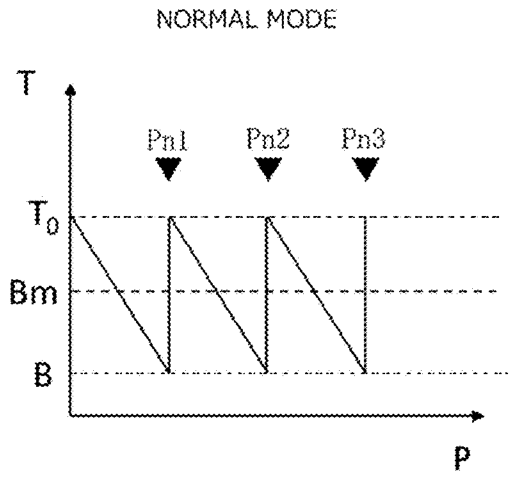
FIG. 15B
(Amended)
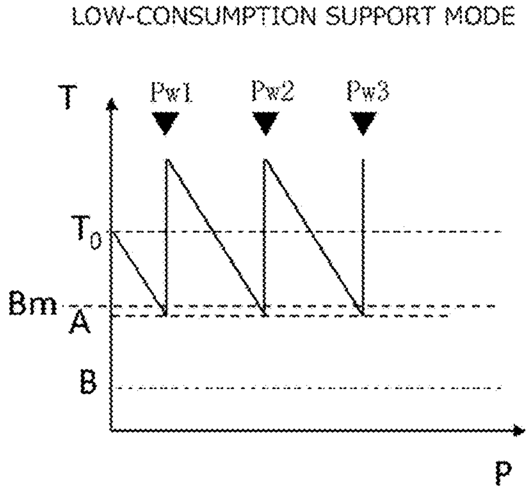

FIG. 18A
(Amended)
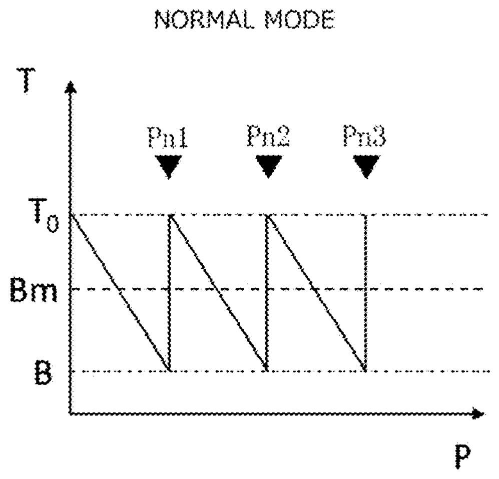
FIG. 18B
(Amended)
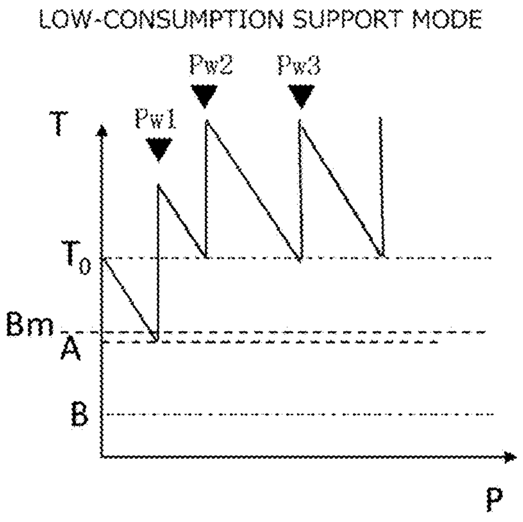

IMAGE FORMING APPARATUS

BACKGROUND OF THE INVENTION

Field of the Invention

The present invention relates to an image forming apparatus.

Description of the Related Art

In general, an electrophotographic image forming apparatus forms an image by transferring a toner image formed on the surface of a photosensitive drum onto a transfer material as a transfer medium. As a method for replenishing developer, for example, a process cartridge type and a toner container replenishment type have been known. The process cartridge type is a method in which a photosensitive drum and a developer container are integrated as a process cartridge, and when developer is used up, the process cartridge is replaced with a new one. On the other hand, the toner container replenishment type is a method in which when toner is used up, a developer container is replenished with toner from a toner container such as a toner pack and a toner bottle.

Conventionally, as a toner container replenishment type, a toner pack type in which when the amount of toner in a developer container becomes equal to or less than a predetermined remaining amount, an indication to prompt a user for toner replenishment is performed such that the user supplies toner to the developer container from a toner pack having refill toner contained therein to enable refilling of toner has been proposed (Japanese Patent Application Publication No. 2020-154302). In this case, a predetermined remaining amount state of toner in the developer container is detected by detecting the presence/absence of toner at a predetermined position in the developer container by a sensor as detection means provided on the image forming apparatus side, and control means (sequence) for determining a timing of a predetermined remaining amount of toner in the developer container on the basis of the detection result is used.

SUMMARY OF THE INVENTION

However, if a cycle where toner is replenished after toner is used until the amount of toner in the developer container becomes equal to or less than a predetermined remaining amount as disclosed in Japanese Patent Application Publication No. 2020-154302 is repeated, toner fogging may occur at the end of lifetime of the main body.

In Japanese Patent Application Publication No. 2020-154302, a developer container in which deteriorated toner remains is replenished with toner, and hence an average number of times by which each particle of toner in the developer container after toner replenishment is rubbed (hereinafter referred to as “number of times of rubbing”) is larger than that of toner in a brand-new state. Thus, toner that has remained in the developer container when the predetermined remaining amount has been reached again is more deteriorated because the number of times of rubbing is larger than that in the previous predetermined remaining amount state. If the predetermined remaining amount state and the toner replenishment are repeated, more deteriorated toner is accumulated in the developer container, and as a result, fogging caused by toner deterioration may be worse.

In a mono-component contact developing system, when toner on a developing roller passes a developing blade pressing portion, the toner is rubbed, and toner deterioration progresses mainly at this timing. In particular, when a user continuously prints only a large number of images with low print percentages, the number of prints until the amount of toner reaches a predetermined remaining amount becomes larger, and the number of times of rubbing also increases correspondingly. Thus, toner deterioration progresses, and, for example, fogging caused by toner deterioration is apt to occur.

The present invention has been made in view of the above-mentioned problems, and it is an object thereof to provide a technology for suppressing occurrence of image adverse effect caused by toner deterioration in an image forming apparatus of a toner container replenishment type.

The present invention provides an image forming apparatus, comprising:

- an accommodation chamber configured to accommodate developer therein;
- a photosensitive drum;
- a developing roller configured to supply the developer from the accommodation chamber to a surface of the photosensitive drum;
- a notification unit configured to make a notification to a user by indication on an indicator; and,
- a control unit configured to control the notification unit, wherein:

- a replenishment container configured to replenish the accommodation chamber with the developer is detachably attached;
- the control unit is capable of controlling the image forming apparatus in a first mode and a second mode different from the first mode;
- the control unit controls the notification unit to make a first notification indicating that an amount of the developer in the accommodation chamber is a first state, a second notification indicating that the amount of the developer is a second state that is smaller than the amount of the developer in the first state, and a third notification indicating that the amount of the developer is a third state that is smaller than the amount of the developer in the second state and;
- the control unit controls the notification unit to make the notifications in an order of the first notification, the second notification, and the third notification in the first mode as consumption of the developer progresses, and makes the notifications in the second mode in an order different from the order in the first mode.

The present invention also provides an image forming apparatus, comprising:

- an accommodation chamber configured to accommodate developer therein;
- a photosensitive drum;
- a developing roller configured to supply the developer from the accommodation chamber to a surface of the photosensitive drum;
- a notification unit configured to make a notification to a user by indication on an indicator; and
- a control unit configured to control the notification unit, wherein:

- a replenishment container configured to replenish the accommodation chamber with the developer is detachably attached;
- the control unit is capable of controlling the image forming apparatus in a first mode and a second mode different from the first mode;

the control unit controls the notification unit to make a first notification indicating that an amount of the developer in the accommodation chamber is a first state, a second notification indicating that the amount of the developer is a second state that is smaller than the amount of the developer in the first state, and a third notification indicating that the amount of the developer is a third state that is smaller than the amount of the developer in the second state and;

the control unit controls the notification unit to make the second notification when a remaining amount of the developer becomes a first remaining amount in the first mode, and makes the second notification when the remaining amount of the developer becomes a second remaining amount larger than the first remaining amount in the second mode.

The present invention can provide a technology for suppressing occurrence of image adverse effect caused by toner deterioration in an image forming apparatus of a toner container replenishment type.

Further features of the present invention will become apparent from the following description of exemplary embodiments with reference to the attached drawings.

BRIEF DESCRIPTION OF THE DRAWINGS

FIGS. 15A and 15B are relational diagrams illustrating a durable number of prints P and remaining amount of toner T according to Example 1;

FIGS. 18A and 18B are relational diagrams illustrating a durable number of prints P and remaining amount of toner T according to Example 4.

DESCRIPTION OF THE EMBODIMENTS

Figure 1:
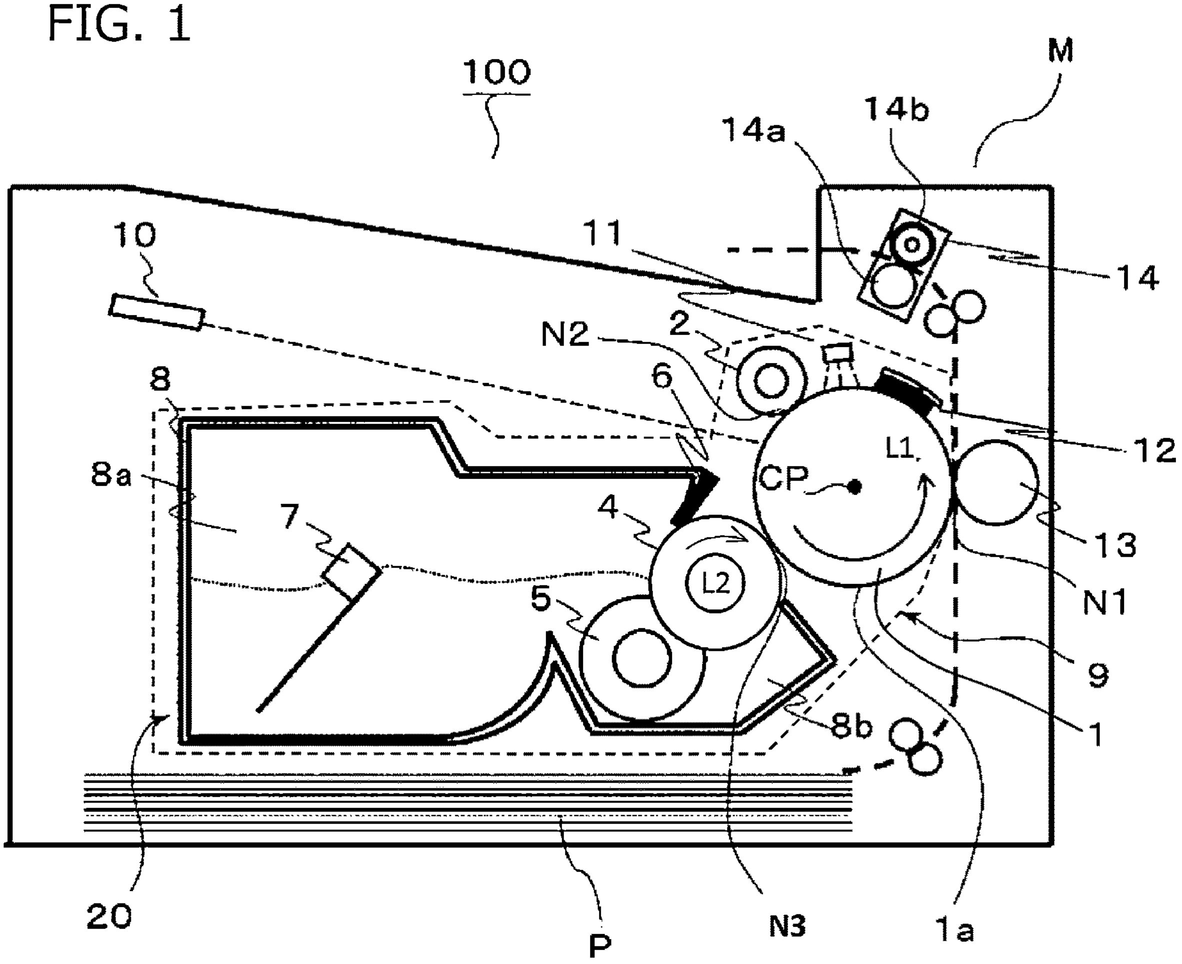
FIG. 1 is a schematic overall view illustrating an image forming apparatus according to Example 1.

Referring to the drawings, exemplary embodiments of the present invention are described in detail below. However, the dimensions, materials, shapes, and relative arrangements of components described in the embodiments are not intended to limit the scope of the present invention to only the ones unless otherwise described. In the following description, the materials and shapes of members described once are the same in the subsequent description as in the first description unless otherwise described again. For configurations and steps that are not particularly illustrated or described, well-known technologies or publicly known technologies in the technical field can be applied. Overlapping descriptions are sometimes omitted.

Recording materials used in an image forming apparatus include various sheet materials with different materials, for example, paper such as plain paper and heavy paper, plastic films such as sheets for overhead projectors, sheets with special shapes such as envelopes and index paper, and cloth.

Example 1

Overall Configuration

First, Example 1 of the present invention is described. FIG. 1 is a schematic overall view of an electrophotographic monochrome laser beam printer as an image forming apparatus 100 according to Example 1. Paper width sizes supported by the printer are an A4 paper size and a letter paper size. In an apparatus main body M of the image forming apparatus 100, a direct-transfer process unit 9 is mounted. The process unit 9 has a photosensitive drum 1, and a charging roller 2, a developing apparatus 20, a static eliminating apparatus 11, and a brush member 12 that are disposed around the photosensitive drum 1.

Furthermore, the apparatus main body M has a scanner unit 10 for irradiating the photosensitive drum 1 with laser to form an electrostatic latent image. Furthermore, the apparatus main body M has a transfer roller 13 for forming a transfer nip N1 between the photosensitive drum 1 and the transfer roller 13 and transferring a toner image onto a recording material P at the transfer nip N1. The transfer roller 13 contacts a surface 1*a* of the photosensitive drum 1 to transfer a toner image on the photosensitive drum 1 onto the recording material P.

Note that, in the present example, the process unit 9 is detachably mountable to the apparatus main body M, but the configuration is not limited thereto. For example, the process unit 9 may be undetachable from the apparatus main body M. In the case of a full-color image forming apparatus 100, a plurality of (for example, four; yellow, magenta, cyan, and black) the process units 9 may be provided for respective colors.

The photosensitive drum 1 as an image bearing member is a photosensitive member that is rotatable about a rotation axis CP extending in an axial direction and is formed into a cylindrical shape. The photosensitive drum 1 in the present example has a photosensitive layer formed of a negative-charging organic photosensitive member on a drum-shaped substrate made of aluminum. More specifically, the photosensitive drum 1 is a rigid body obtained by coating the outer circumferential surface of an aluminum cylinder having a diameter of 24 mm with a resistive layer, an under coat layer, and a photosensitive layer sequentially formed by a dipping coating method, and the photosensitive layer has a charge generation layer and a charge transport layer. The thickness of the charge transport layer is 22 μm. The photosensitive drum 1 is rotationally driven by a drive motor about the rotation axis CP in a direction of the arrow L1 at a predetermined peripheral velocity. The peripheral velocity of the photosensitive drum 1 regulates the speed of image formation by the image forming apparatus 100, and is thus also called "process speed".

The charging roller 2 as a charging member contacts the photosensitive drum 1 with a predetermined contact force, and forms a charging portion N2. By being applied with a charging voltage as a direct voltage from a charging voltage application circuit (not shown), the charging roller 2 uniformly charges the surface 1*a* of the photosensitive drum 1 to a predetermined potential. The charging roller 2 in the present example is applied with a charging voltage of −1,400 V such that a surface potential (pre-exposure potential VD) of the photosensitive drum 1 becomes −800 V. In other words, the photosensitive drum 1 is charged by the charging roller 2 to the pre-exposure potential VD in the same negative polarity direction as the polarity of toner. The charging roller 2 has a cored bar with a diameter of 6 mm, a base layer made of hydrin rubber, and a surface layer made of urethane, and is configured to have an outer diameter of 12 mm. The resistance of the charging roller 2 is $1\times10^{6}\Omega$ or less, and the hardness thereof is 70 degrees measured by an MD-1 durometer. Note that a direct voltage is used as the charging voltage in the present example, but the voltage is not limited thereto. The charging voltage may be a voltage obtained by superimposing a direct voltage with an alternating voltage.

The scanner unit 10 applies laser corresponding to image data input from an external apparatus to the photosensitive drum 1 by using a polygon mirror, thereby scanning and exposing the surface 1*a* of the photosensitive drum 1. By the exposure, an electrostatic latent image corresponding to the image data is formed on the surface 1*a* of the photosensitive drum 1. The scanner unit 10 is a semiconductor laser, and applies a laser having a wavelength of 800 nm and can change the light amount of laser. Note that the scanner unit 10 is not limited to a laser scanner apparatus, and, for example, an LED exposure apparatus having an LED array in which a plurality of LEDs are arranged along a longitudinal direction of the photosensitive drum 1 may be employed.

The developing apparatus 20 has a developer container 8 serving as a frame body of the developing apparatus 20, a developing roller 4, and a supply roller 5 for supplying toner to the developing roller 4. Inside the developer container 8 as a housing unit, a toner accommodation chamber 8*a* for housing toner (developer) therein and a developing chamber 8*b* having the developing roller 4 are formed. The developing roller 4 and the supply roller 5 are rotatably supported by the developer container 8. The developing roller 4 is disposed at an opening of the developer container 8 so as to be opposed to the photosensitive drum 1. The supply roller 5 rotatably contacts the developing roller 4. The supply roller 5 once strips toner that has not been developed on the photosensitive drum 1 at a developing portion N3 but remains on the surface of the developing roller 4, and coats the surface of the developing roller 4 with another toner housed in the developer container 8.

The developer container 8 before use is loaded with toner of T0 [g], which assumes an amount capable of printing 5,000 images with a print percentage of 4% according to ISO 19752. In other words, it is required that at least 5,000 or more images with a print percentage of 4% or less be printed until the first toner replenishment.

The developing apparatus 20 uses a contact developing system as a developing system. Specifically, a toner layer carried by the developing roller 4 contacts the photosensitive drum 1 at the developing portion N3 where the photosensitive drum 1 and the developing roller 4 are opposed to each other. In other words, the developing roller 4 as a developing member forms the developing portion N3 between the developing roller 4 and the photosensitive drum 1. The developing roller 4 is applied with a developing voltage as a direct voltage from a developing voltage application unit (not shown). When toner carried by the developing roller 4 is transferred from the developing roller 4 to the surface 1*a* of the photosensitive drum 1 under the developing voltage in accordance with a potential distribution of the surface 1*a*, an electrostatic latent image is developed on the toner image. Note that the present example employs a reversal developing system. Specifically, after the photosensitive drum 1 is charged in a charging process, the photosensitive drum 1 is exposed in an exposure process such that toner adheres to a surface region of the photosensitive drum 1 where the amount of charges is reduced, with the result that a toner image is formed.

Furthermore, in the present example, toner which has a particle diameter of 6 μm and whose regular charging polarity is negative is used. As toner in the present example, polymerized toner generated by a polymerization method is employed as an example. Toner in the present example is what is called non-magnetic single-component developer, which contains no magnetic components and is carried by the developing roller 4 mainly due to intermolecular force or electrostatic force (image force). However, single-component developer that contains magnetic components may be used. The single-component developer may contain, in addition to toner particles, an additive (for example, wax or silica fine particles) for adjusting flowability and charging performance of toner. Furthermore, two-component developer configured by non-magnetic toner and carriers having magnetic property may be used as developer. When developer having magnetic property is used, as a developer bearing member, for example, a cylindrical developing sleeve in which a magnet is disposed is used. The developing apparatus 20 may be of a non-contact development type, which is disposed with a predetermined gap from the photosensitive drum 1.

The developing roller 4 is obtained by coating a base layer made of silicone rubber with a surface layer made of urethane rubber so as to have an outer diameter of 15 mm with respect to a cored bar having a diameter of 6 mm. The resistance value of the developing roller 4 is $1\times10^{4}$ to $1\times10^{12}\Omega$. The supply roller 5 is a conductive elastic sponge roller obtained by forming a foamed layer on the outer circumference of a cored bar having a diameter of 6 mm. The resistance value of the supply roller 5 is $1\times10^{4}$ to $1\times10^{8}\Omega$, and the hardness of the supply roller 5 can be measured by measuring a load when a plate having a longitudinal width of 50 mm is caused to enter the surface of the supply roller 5 by 1 mm, and in the present example, the hardness is 200 gf.

A stirring member 7 is provided inside the developer container 8. The stirring member 7 is driven by a drive motor to rotate, and stirs toner in the developer container 8 and sends the toner toward the developing roller 4 and the supply roller 5. The stirring member 7 has a role of circulating toner that has not been used for development and peeled off the developing roller 4 in the developer container 8 such that the toner in the developer container 8 becomes uniform.

In an opening of the developer container 8 in which the developing roller 4 is disposed, a developing blade 6 for regulating the amount of toner to be carried by the developing roller 4 is disposed. Toner supplied to the surface of the developing roller 4 passes a part of the developing roller 4 opposed to the developing blade 6 along with the rotation of the developing roller 4 in a direction of the arrow L2, so that the toner is uniformly thinned and charged to a negative polarity by triboelectric charging.

The developing blade 6 is a SUS plate made of metal with a thickness of 0.1 mm, and is disposed such that a free end of the developing blade 6 contacts the developing roller 4 on the downstream side in a rotation direction of the developing roller 4. The developing blade 6 used in the present example is obtained by cutting the distal end of the SUS plate from a contact surface side of the developing roller 4. The distal end part of the developing blade 6 is bent in the cutting direction by cutting.

The transfer roller 13 as a transfer unit has a base layer made of ionic conductive sponge so as to have an outer diameter of 15 mm with respect to a cored bar with a diameter of 6 mm. The resistance value of the transfer roller 13 is $4\times10^7\Omega$ under an environment of temperature of 22° C., and the hardness thereof is 30 degrees by Asker C durometer manufactured by KOBUNSHI KEIKI CO., LTD. The width of a sponge part of the transfer roller 13 is substantially equal to a letter width (8.5 inch=215.9 mm).

When an instruction for image forming is output to the image forming apparatus 100, an image forming process is started on the basis of image data input from an external computer connected to the image forming apparatus 100. When the image forming process is started, the photosensitive drum 1 is driven by a drive source (not shown) and rotated in a direction of the arrow L1 in FIG. 1 at a predetermined process speed. In the present example, the process speed of the photosensitive drum 1 is 140 rpm.

In the process unit 9, a static eliminating apparatus 11 for eliminating charge of the photosensitive drum 1 is provided on the downstream side of the transfer nip N1 and the upstream side of the charging portion N2 in the rotation direction of the photosensitive drum 1 (direction of arrow L1). More specifically, the static eliminating apparatus 11 as a static eliminating unit is disposed between the brush member 12 and the charging roller 2 in the rotation direction of the photosensitive drum 1. In order to generate stable discharge at the charging portion N2, the static eliminating apparatus 11 eliminates surface potential of the photosensitive drum 1 before reaching the charging portion N2.

The brush member 12 is supported by a support member (not shown) and disposed at a fixed position with respect to the photosensitive drum 1, and rubs the surface of the photosensitive drum 1 along with the rotation of the photosensitive drum 1. The brush member 12 collects paper dust that have been transferred onto the photosensitive drum 1 at the transfer nip N1 from the recording material P, and reduces the amount of paper dust that moves to the charging portion N2 and the developing apparatus 3 on the downstream side of the brush member 12 in the movement direction of the photosensitive drum 1. If paper dust is not collected by the brush member 12, the paper dust is present at the charging portion N2 to hinder the charging and reduce the charging potential after passing the charging portion N2 to be lower than the surroundings, so that a part where the paper dust adheres is unintentionally developed into black. This adverse effect appears, for example, as black spots on a solid white image. On the other hand, it is desired that transfer residual toner that has remained on the photosensitive drum 1 after the transfer nip N1 be caused to pass the brush member 12 while adhering to the photosensitive drum 1. If toner adheres to the brush member 12 and is deposited, the toner is present at the brush member 12 as a toner mass, and the toner mass may be ejected from the brush member 12 onto the photosensitive drum 1 at an unintentional timing to cause an image failure. From the above, an ideal function of the brush member 12 is to collect paper dust on the photosensitive drum 1 as much as possible and to cause toner to pass as much as possible.

Then, the charging roller 2 uniformly charges the surface potential (pre-exposure potential VD) of the rotating photosensitive drum 1 to be −800 V. The scanner unit 10 applies laser toward the photosensitive drum 1 on the basis of input image data. In this manner, an electrostatic latent image is formed on the uniformly charged surface 1*a* of the photosensitive drum 1. In the present example, the scanner unit 10 applies laser with a light amount of 0.45 $\mu J/cm^2$ such that a post-exposure potential VL of the photosensitive drum 1 becomes −100 V.

At this time, a toner layer that has been changed to a predetermined polarity is formed on the surface of the developing roller 4. Then, when the developing roller 4 is applied with a developing voltage from a developing voltage application unit (not shown), the electrostatic latent image on the photosensitive drum 1 is developed at the developing portion N3, and a toner image is formed on the photosensitive drum 1. In the present example, a developing voltage of −400 V is applied to the developing roller 4.

In parallel to the above-mentioned image forming process, a recording material P stored at a lower part of the image forming apparatus 100 is fed. The recording material P is transported to the transfer nip N1 in synchronization with a timing at which the toner image formed on the photosensitive drum 1 reaches the transfer nip N1. Furthermore, a transfer voltage as a direct voltage is applied to the transfer roller 13 from a transfer voltage application circuit (not shown) in synchronization with the timing at which the toner image formed on the photosensitive drum 1 reaches the transfer nip N1. In this manner, the toner image carried on the photosensitive drum 1 is transferred to the recording material P passing the transfer nip N1. In the present example, a transfer voltage of +1500 V is applied to the transfer roller 13.

The recording material P having the toner image transferred thereon is transported to the fixing apparatus 14. The fixing apparatus 14 is a heat fixing type apparatus for performing image fixing processing by heating and melting toner on the recording material P. The fixing apparatus 14 includes a fixing film 14*a* including a ceramic heater for heating, and a pressure roller 14*b* to be brought into pressure contact with the fixing film 14*a*. When the recording material P passes between the fixing film 14*a* and the pressure roller 14*b*, the toner image is heated and pressurized. This operation melts toner particles, and when the toner particles are fixed thereafter, the toner image is fixed to the recording material P. The recording material P that has passed the fixing apparatus 14 is discharged to the outside of the image forming apparatus 100 by a discharge roller pair (not shown).

Furthermore, the image forming apparatus 100 has an environment detection unit (not shown). The environment detection unit is disposed inside the image forming apparatus 100 to detect surrounding temperature and humidity. On the basis of the detection result, control of bias applied to the charging roller 2 and the developing roller 4 and control of the scanner unit 10, the transfer roller 13, and the fixing apparatus 14 are corrected.

Collection of Transfer Residual Toner

Transfer residual toner that has not been transferred to the recording material P but remains on the photosensitive drum 1 is removed in the following process. The surface potential of the photosensitive drum 1 after the transfer process is reduced when applied with a transfer current while passing the transfer nip N1. The surface potential of the photosensitive drum 1 after the transfer process in the present example is −150 V. After the transfer process, the charge of the photosensitive drum 1 is eliminated by the static eliminating apparatus 11 such that the surface potential remaining on the photosensitive drum 1 becomes 0 V, and the photosensitive drum 1 rotates towards the charging portion N2. In the transfer residual toner, toner that has been charged to positive polarity and toner that has been charged to negative polarity but does not have sufficient charges are mixed. By eliminating the charge of the photosensitive drum 1 after transfer by the static eliminating apparatus 11 and generating uniform discharge by the charging roller 2, the transfer residual toner is charged to negative polarity again. The transfer residual toner that has been charged to negative polarity again at the charging portion N2 reaches the developing portion N3 along with the rotation of the photosensitive drum 1. Then, a surface region of the photosensitive drum 1 that has passed the charging portion N2 is exposed by the scanner unit 10 such that an electrostatic latent image is written while the transfer residual toner adheres to the surface.

Now, the behavior of transfer residual toner that has reached the developing portion N3 is described for different parts: an exposed part and a non-exposed part of the photosensitive drum 1. Transfer residual toner that has adhered to the non-exposed part of the photosensitive drum 1 is transferred to the developing roller 4 at the developing portion N3 due to a potential difference between the pre-exposure potential VD of the non-exposed part of the photosensitive drum 1 and the developing voltage, and is collected to the developer container 8. This is because the regular charging polarity of toner is negative and the developing voltage applied to the developing roller 4 is positive with respect to the pre-exposure potential VD at the non-exposed part. Note that the toner collected in the developer container 8 is stirred and dispersed by the stirring member 7 together with the toner in the developer container 8, and is carried by the developing roller 4 and used for a developing process again.

On the other hand, transfer residual toner that has adhered to an exposed part of the photosensitive drum 1 is not transferred from the photosensitive drum 1 to the developing roller 4 at the developing portion N3 but remains on the drum surface. This is because the regular charge polarity of toner is negative polarity and the developing voltage applied to the developing roller 4 has a negative potential lower than the pre-exposure potential VD of the exposed part. The transfer residual toner that has remained on the surface 1*a* of the photosensitive drum 1 is carried by the photosensitive drum 1 and moves to the transfer nip N1 together with other toner transferred from the developing roller 4 to the exposed part, and is transferred to the recording material P at the transfer nip N1.

In this manner, in the present example, the process unit 9 has a cleaner-less configuration in which transfer residual toner is collected to the developing apparatus 20 and used again. Owing to the cleaner-less configuration of the process unit 9, an installation space for a collection container for collecting transfer residual toner is not required, and the image forming apparatus 100 can be further downsized, and printing cost can be reduced owing to the re-use of transfer residual toner.

Configurations of Developer Container and Toner Pack

Figure 2A:
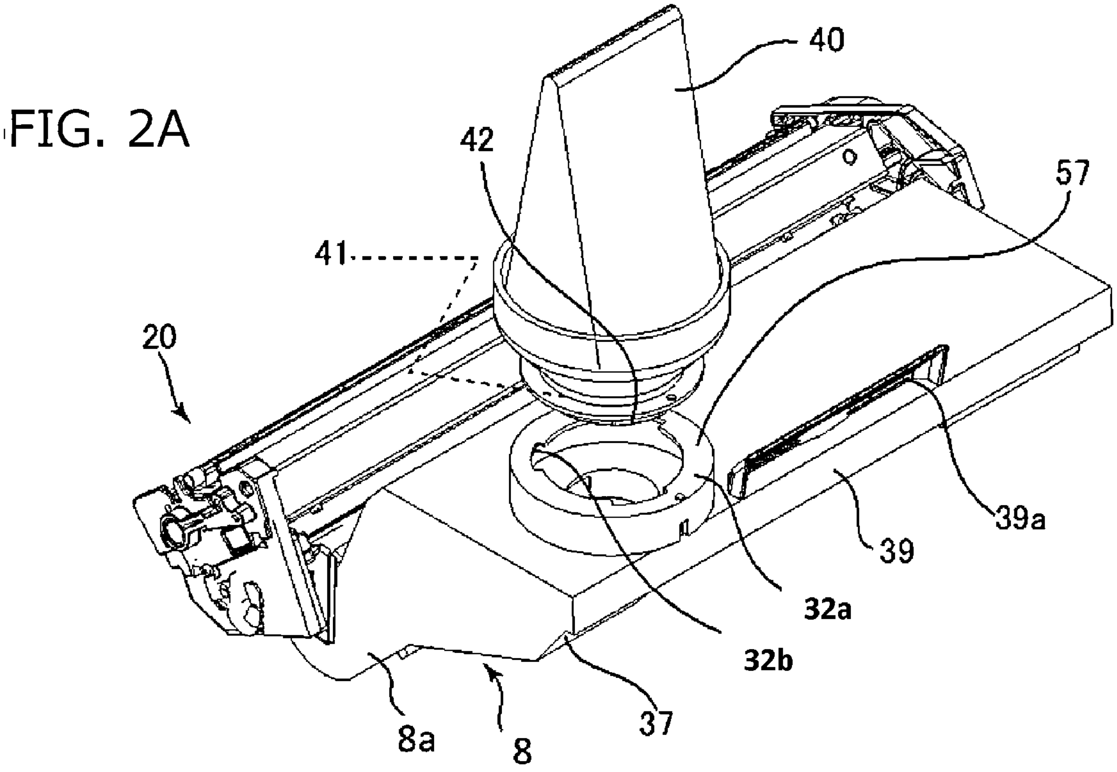
FIGS. 2A and 2B are a perspective view and a front view illustrating a developer container and a toner pack, respectively.
Figure 2B:
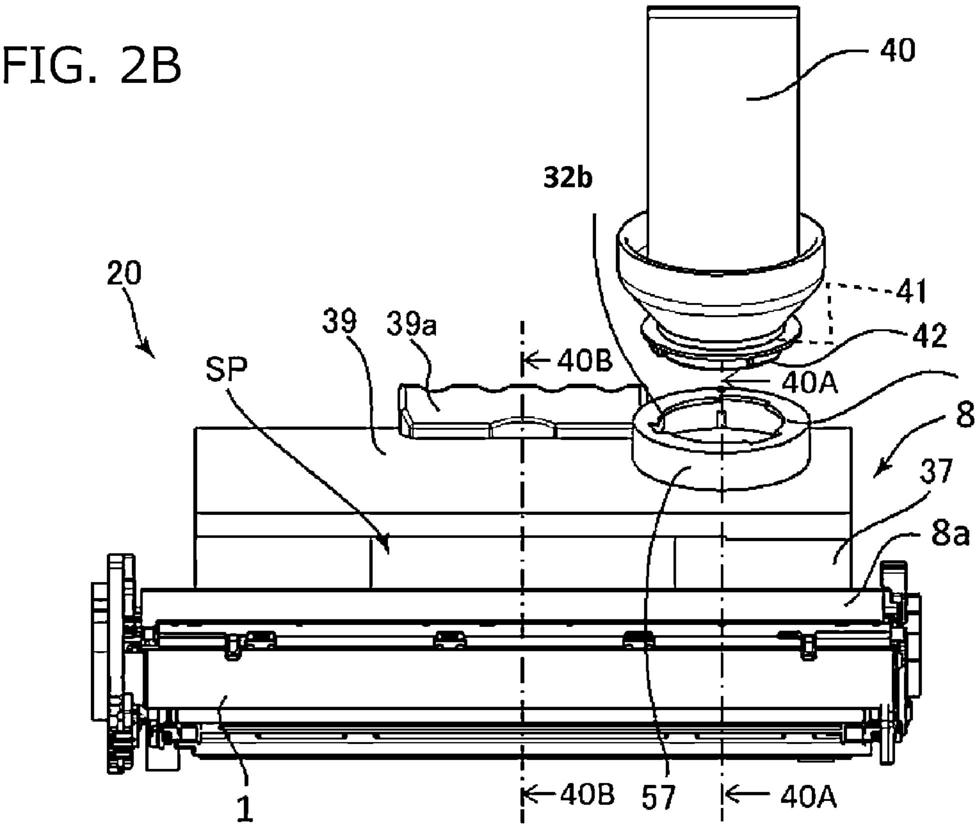
Figure 3A:
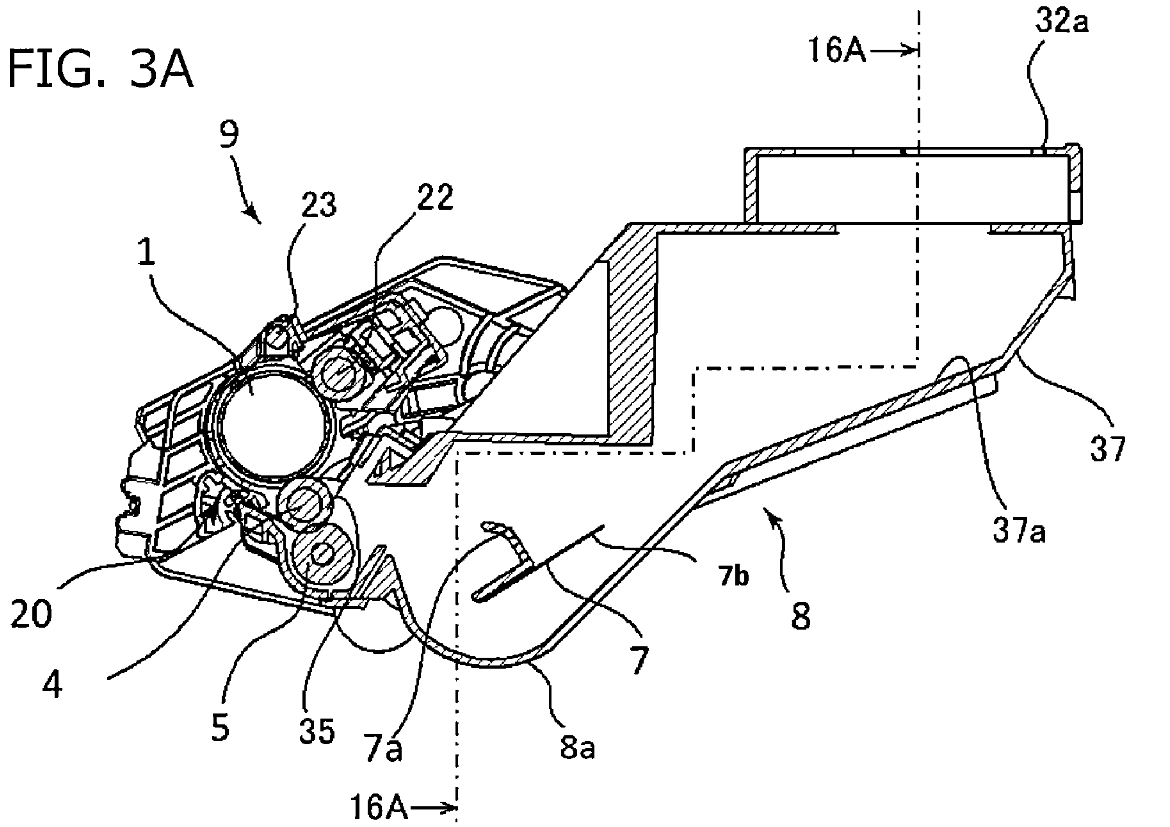
FIGS. 3A and 3B are cross-sectional views taken along the lines 40A and 40B in FIG. 2B, respectively.
Figure 3B:
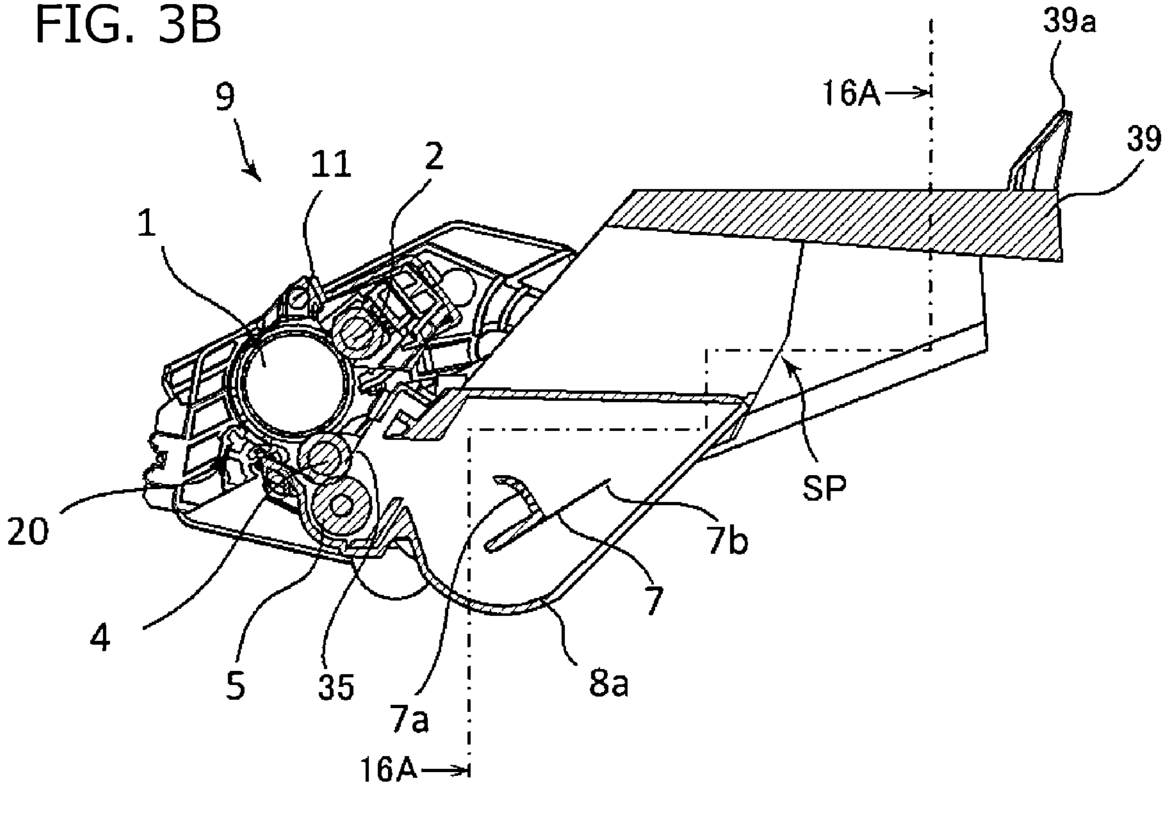

Next, configurations of the developer container 8 and the toner pack 40 as a replenishment container are described. FIG. 2A is a perspective view illustrating the developer container 8 and the toner pack 40, and FIG. 2B is a front view illustrating the developer container 8 and the toner pack 40. FIG. 3A is a cross-sectional view taken along the line 40A-40A in FIG. 2B, and FIG. 3B is a cross-sectional view taken along the line 40B-40B in FIG. 2B.

As illustrated in FIGS. 2A and 2B and FIGS. 3A and 3B, the developer container 8 has an accommodation chamber 8*a* in which a stirring member 7 is disposed, and the accommodation chamber 8*a* as a housing unit for housing developer therein extends over the longitudinal direction of the developer container 8 (left-right direction in FIG. 2B). Furthermore, the accommodation chamber 8*a* is configured integrally with a frame body that rotatably supports the developing roller 4 and the supply roller 5, and houses developer (toner) to be carried by the developing roller 4. Furthermore, the developer container 8 has a base portion 37 which is present at one end portion of the accommodation chamber 8*a* in the longitudinal direction and at which a mount portion 57 is provided. At an upper end portion (distal end portion) of the base portion 37, the mount portion 57 capable of mounting the toner pack 40 is provided. In the mount portion 57, a replenishment port 32*a* for replenishing the accommodation chamber 8*a* with developer from the toner pack 40 is formed. The toner pack 40 can be mounted to the mount portion 57 while being exposed to the outside of the apparatus.

The developer container 8 is configured such that toner replenished from the replenishment port 32*a* reaches the stirring member 7 only by its weight. The phrase "only by its weight" as used herein means that although a member (transport member) that moves or slidingly moves in order to transport toner is not provided between the replenishment port 32*a* and the stirring member 7 in the developer container 8, toner reaches stirring member 7 by its weight. In the developer container 8, the stirring member 7 is a rotating body closest to the replenishment port 32*a*, and is disposed such that toner in the accommodation chamber 8*a* reaches the developing roller 4 or the supply roller 5 when the stirring member 7 rotates.

The grip portion 39 has a tab portion 39*a* that can be gripped by a user by hooking with a finger, and the tab portion 39*a* is formed to protrude upward from the top surface of the grip portion 39. The base portion 37 is formed into an internal hollow shape, and the replenishment port 32*a* is formed at its top surface. The replenishment port 32*a* is connectable to the toner pack 40.

The toner pack 40 is detachably attached to the mount portion 57 of the base portion 37. Furthermore, the toner pack 40 has an openable/closable shutter member 41 provided at an opening, and a plurality of (three in the present embodiment) protrusions 42 formed correspondingly to a plurality of (three in the present embodiment) groove portions 32*b* formed in the mount portion 57. For replenishing the developer container 8 with toner, a user positions the protrusion 42 of the toner pack 40 so as to pass the groove portion 32*b* of the mount portion 57, thereby connecting the toner pack 40 to the mount portion 57. Then, by rotating the toner pack 40 by 180 degrees under this state, the shutter member 41 of the toner pack 40 contacts a contact part (not shown) of the mount portion 57, and rotates with respect to the main body of the toner pack 40 such that the shutter member 41 is opened. In this manner, toner housed in the toner pack 40 drops from the toner pack 40, and the dropped toner enters the hollow-shaped base portion 37 through the replenishment port 32*a*. Note that the shutter member 41 may be provided on the replenishment port 32*a* side.

The base portion 37 has an inclined surface 37*a* at a position opposed to the opening of the replenishment port 32*a*, and the inclined surface 37*a* is inclined downward toward the accommodation chamber 8*a*. Thus, the toner replenished from the replenishment port 32*a* is guided to the accommodation chamber 8*a* by the inclined surface 37*a*. As illustrated in FIGS. 3A and 3B, the stirring member 7 has a stirring shaft 7*a* extending in the longitudinal direction, and a blade portion 7*b* fixed to the stirring shaft 7*a* and extending to the outside of the stirring shaft 7*a* in its radial direction. The blade portion 7*b* is a flexible sheet. The stirring member 7 rotates about the stirring shaft 7*a*.

Toner that has been replenished from the replenishment port 32*a* disposed on the upstream side of the stirring member 7 in the transport direction is sent toward the developing roller 4 and the supply roller 5 along with the rotation of the stirring member 7. The transport direction of the stirring member 7 is a direction parallel to the longitudinal direction of the developer container 8. The replenishment port 32*a* and the base portion 37 are disposed at one end portion of the developer container 8 in the longitudinal direction, and when the rotation of the stirring member 7 is repeated, toner spreads over the entire length of the developer container 8. Note that, in the present embodiment, the stirring member 7 is configured by the stirring shaft 7*a* and the blade portion 7*b*, but a spiral-shaped stirring shaft may be used as a configuration for spreading toner over the entire length of the developer container 8.

Figure 4:
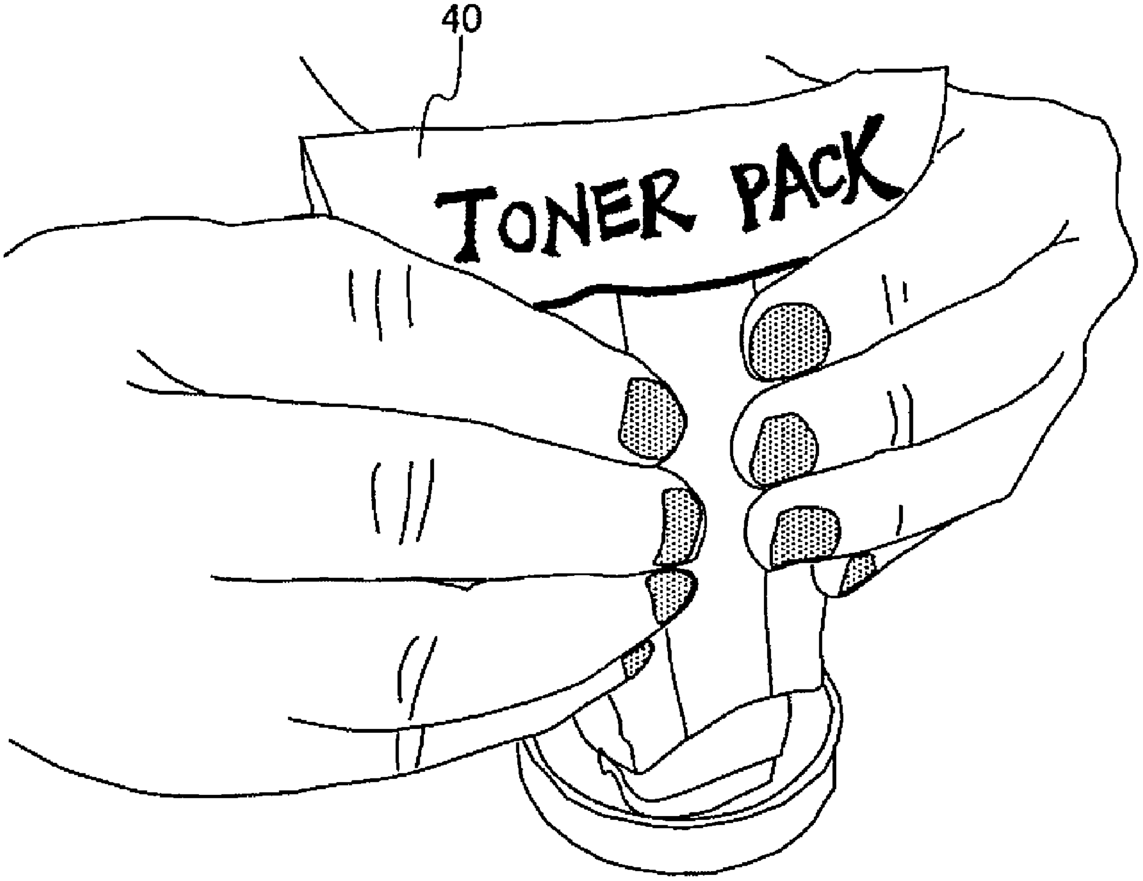
FIG. 4 is a perspective view illustrating a toner pack.
Figure 5A:
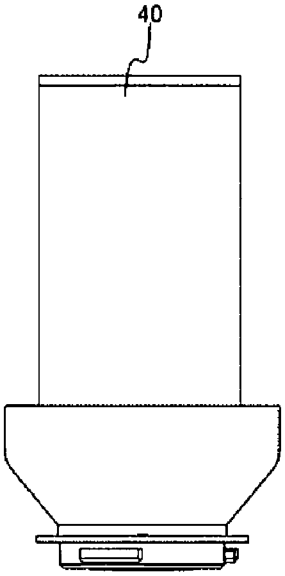
FIGS. 5A to 5C are front views illustrating an example, a first modification, and a second modification of the toner pack, respectively.
Figure 5B:
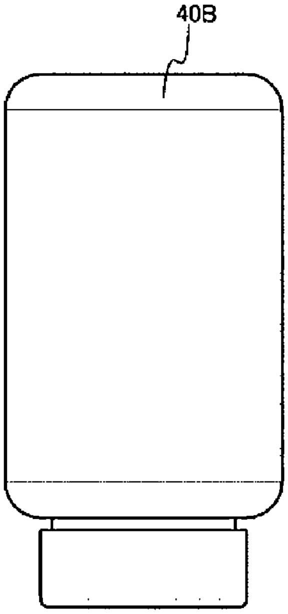
Figure 5C:
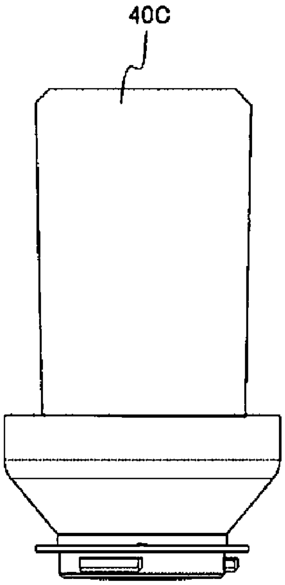

In the present embodiment, the replenishment container is configured by the toner pack 40 made of a deformable plastic bag body as illustrated in FIG. 4 and FIG. 5A, but the configuration is not limited thereto. For example, the toner pack may be configured by a bottle container 40B having a substantially conical shape as illustrated in a first modification in FIG. 5B, and may be configured by a paper container 40C made of paper as illustrated in a second modification in FIG. 5C. In any case, the material and shape of the toner pack are not limited. As a method for discharging toner from the toner pack, it is appropriate to squeeze the toner pack 40 or the paper container 40C with a finger by a user, and it is appropriate to vibrate the bottle container 40B by a user such as tapping to drop the toner. In order to discharge toner from the bottle container 40B, a discharge mechanism may be provided in the bottle container 40B. Furthermore, the discharge mechanism may be configured to receive a drive force when engaged with the apparatus main body M.

Furthermore, in any type of the toner pack, the shutter member 41 may be omitted, or a slide type shutter member may be applied instead of the rotation type shutter member 41. The shutter member 41 may be configured so as to be broken when the toner pack is mounted to the replenishment port 32*a* or the toner pack is rotated in the mounted state, or may have a removable lid structure such as a seal.

Method for Detecting Remaining Amount of Toner

Figure 6A:
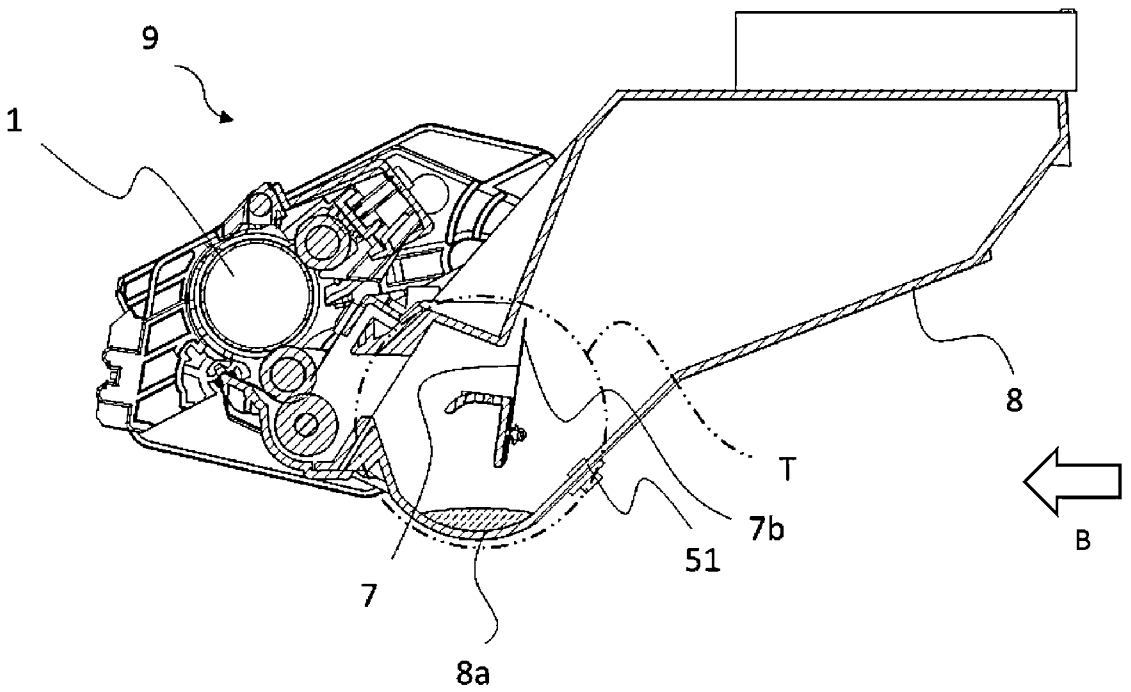
FIGS. 6A and 6B are cross-sectional views illustrating remaining amounts of toner in a developer container.
Figure 6B:
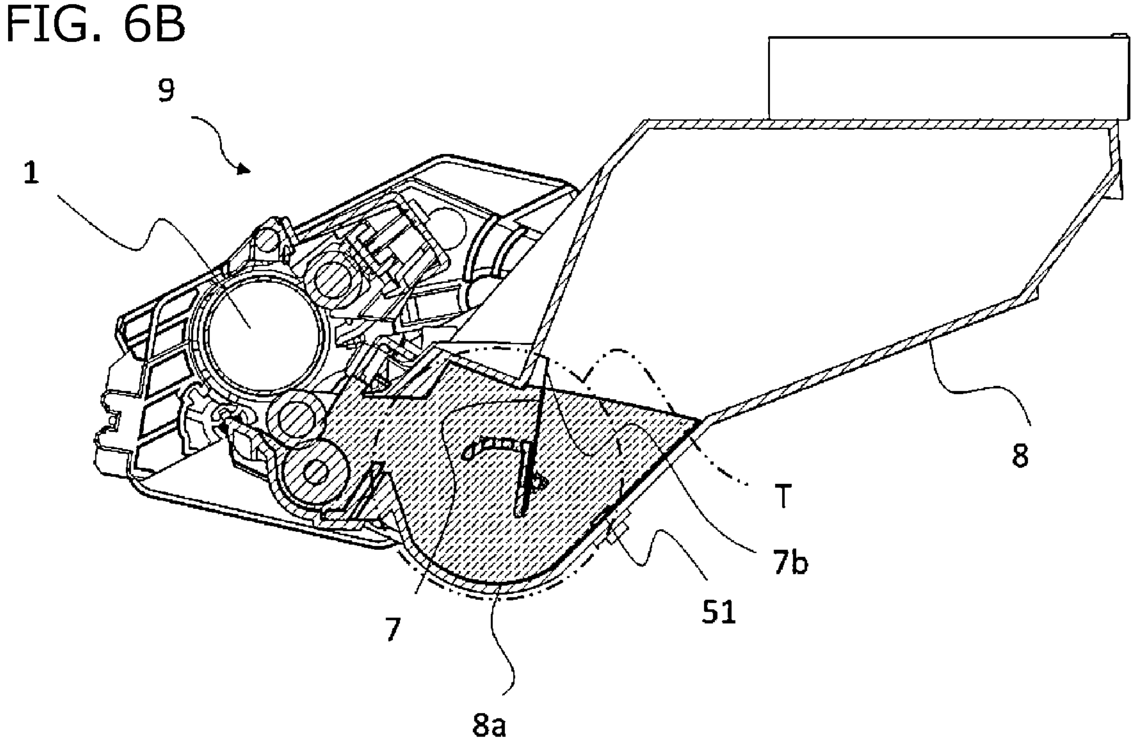
Figure 8:
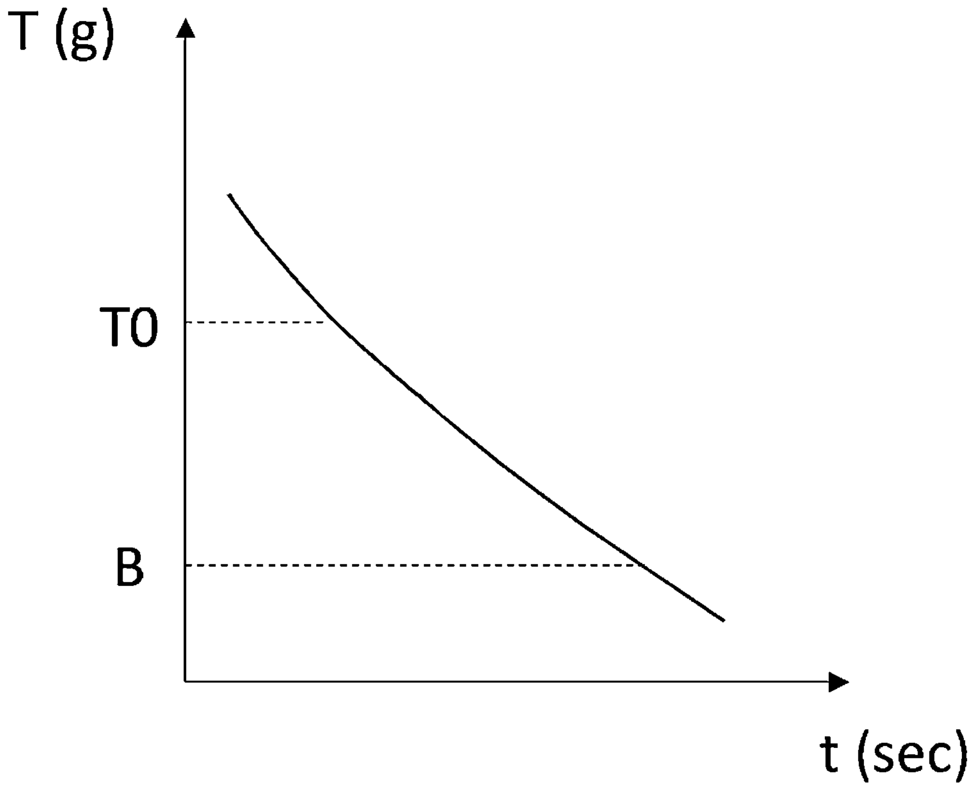
FIG. 8 is a relational diagram illustrating a light reception time t of the toner remaining amount sensor and a remaining amount of toner T.

Next, a method for detecting the remaining amount of toner in the developer container 8 is described with reference to FIGS. 6A and 6B and FIG. 8. As illustrated in FIGS. 6A and 6B, in the developer container 8 in the present embodiment, a toner remaining amount sensor 51 (detection means) for detecting remaining amount information corresponding to the remaining amount of toner in the developer container 8 is placed. FIG. 6A is a cross-sectional view illustrating a developer container in a state in which the remaining amount of toner is small, and FIG. 6B is a cross-sectional view illustrating a developer container in a state in which the remaining amount of toner is large.

Figure 7A:
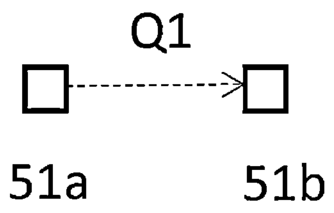
FIGS. 7A and 7B are a cross-sectional view and a circuit diagram illustrating a toner remaining amount sensor, respectively.
Figure 7B:
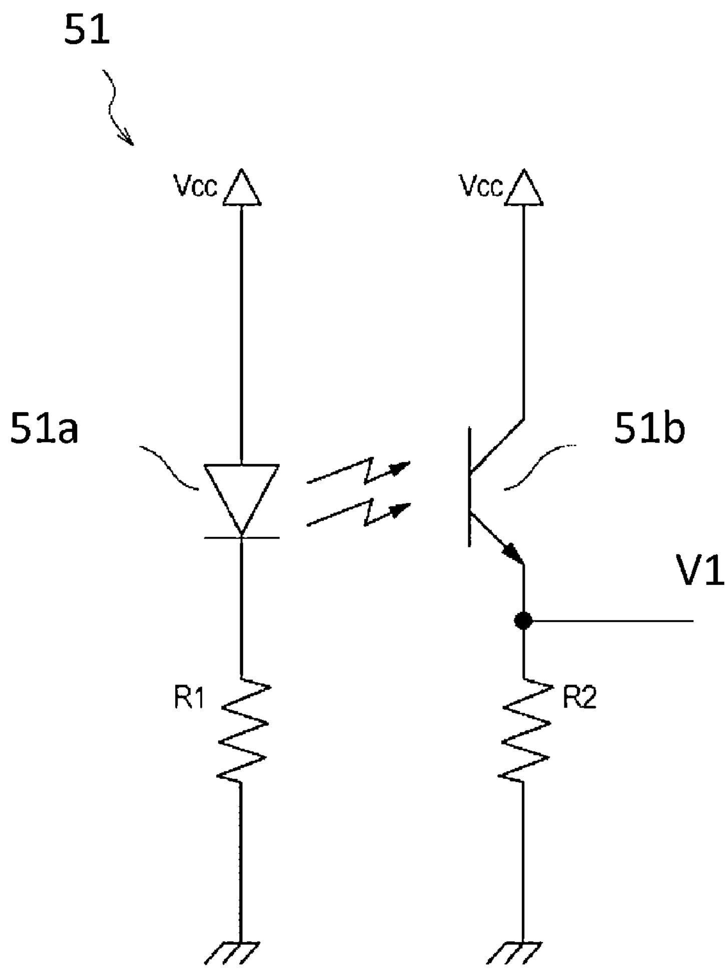

The toner remaining amount sensor 51 has a light emitting portion 51*a* and a light receiving portion 51*b*. FIG. 7A is a cross-sectional view illustrating the toner remaining amount sensor 51, and a schematic view of the toner remaining amount sensor as seen from a direction of the arrow B in FIG. 6A. FIG. 7B is a circuit diagram illustrating an example of a circuit configuration of the toner remaining amount sensor 51.

In FIGS. 7A to 7B, an LED is used for the light emitting portion 51*a*, and a phototransistor that becomes an ON state by light from the LED is used for the light receiving portion 52*b*, but the configuration is not limited thereto. For example, a halogen lamp or a fluorescent light may be applied to the light emitting portion 51*a*, and a photodiode or an avalanche photodiode may be applied to the light receiving portion 51*b*. Note that, in FIG. 7B, a switch (not shown) is provided between the light emitting portion 51*a* and a power supply voltage Vcc, and when the switch is turned to an ON state, a voltage from the power supply voltage Vcc is applied to the light emitting portion 51*a*, and the light emitting portion 51*a* becomes a conductive state. On the other hand, a switch (not shown) is also provided between the light receiving portion 51*b* and the power supply voltage Vcc, and when the switch is turned to an ON state, the light receiving portion 51*b* becomes a conductive state by a current corresponding to a detected light amount.

The power supply voltage Vcc and a current limiting resistor R1 are connected to the light emitting portion 51*a*, and the light emitting portion 51*a* emits light by a current determined by the current limiting resistor R1. Light emitted from the light emitting portion 51*a* passes through the optical path Q1 as illustrated in FIG. 7A, and is received by the light receiving portion 51*b*. The light receiving portion 51*b* has a collector terminal connected to the power supply voltage Vcc and an emitter terminal connected to a detection resistor R2. The light receiving portion 51*b* as a phototransistor receives light emitted from the light emitting portion 51*a*, and outputs a signal (current) corresponding to the received light amount. This signal is converted by the detection resistor R2 into a voltage V1, and is input to an A/D conversion unit 95 in a control unit 90 (see FIG. 9A).

The control unit 90 (CPU 91) determines, on the basis of the input voltage level, whether the light receiving portion 51*b* has received light from the light emitting portion 51*a*. The control unit 90 (CPU 91) calculates a toner amount (developer amount) in the developer container 8 on the basis of the length of a time period during which the light receiving portion 51*b* detects each light and the intensity of received light when toner in the developer container 8 is stirred by the stirring member 7 for a given time. Specifically, the ROM 93 has stored therein in advance a table with which the remaining amount of toner can be output from light reception time and light intensity obtained when toner is transported by the stirring member 7, and the control unit 90 predicts/calculates the remaining amount of toner on the basis of the input to the A/D conversion unit 95 and the table.

More specifically, the optical path Q1 of the toner remaining amount sensor 51 is set so as to intersect with a rotation locus T of the stirring member 7 when viewed from a rotation axis direction of the stirring member 7 illustrated in FIGS. 6A and 6B. Then, a time period during which the optical path Q1 is blocked by toner transported by the stirring member 7 during one turn of the stirring member 7, that is, a time during which the light receiving portion 51*b* does not detect light from the light emitting portion 51*a*, changes depending on the remaining amount of toner. The received light intensity in the light receiving portion 51*b* also changes depending on the remaining amount of toner.

In other words, in FIG. 6A where the remaining amount of toner is small, a time period during which the optical path Q1 is blocked by toner decreases and hence a time period during which light is received by the light receiving portion 51*b* increases, and the intensity of light received by the light receiving portion 51*b* increases. On the other hand, in FIG. 6B where the remaining amount of toner is large, a time period during which light is received by the light receiving portion 51*b* decreases, and the intensity of light received by the light receiving portion 51*b* decreases. Thus, the control unit 90 can determine the toner remaining amount level on the basis of the light reception time or received light intensity of the light receiving portion 51*b* in this manner. As an example, FIG. 8 illustrates a relation between the light reception time t [sec] and the remaining amount of toner T [g]. In a "normal mode" (first mode), which is a mode used by a normal user, when the control unit 90 detects that the remaining amount of toner is B [g], the control unit 90 determines that the status of the remaining amount of toner is Low, and displays Low on a toner remaining amount panel.

Note that the method for detecting/estimating the remaining amount of toner is not limited to the method for detecting optical remaining amount of toner described above with reference to FIGS. 6A and 6B, and various publicly known types of methods for detecting/estimating the remaining amount of toner can be employed. For example, two or more metal plates or conductive resin sheets extending in the longitudinal direction of the developing roller may be disposed on an inner wall of the developer container 8 as a frame body, and electrostatic capacitance between the two metal plates or conductive resin sheets may be measured to detect/estimate the remaining amount of toner. Alternatively, a load cell may be provided to support the developing apparatus 30 from downward, and the CPU 91 may calculate the remaining amount of toner by subtracting the weight of the developing apparatus 20 with empty toner from the weight measured by the load cell. Furthermore, in the present example, the remaining amount of toner is detected by a single sensor of an optical toner remaining amount detection type, but the remaining amount of toner may be detected by a plurality of sensors.

The method for detecting the remaining amount of toner has been described above, but the remaining amount of toner may be determined by calculating a toner consumption amount from a pixel count described later and subtracting the consumption amount. In particular, the remaining amount of toner in an initial state corresponds to a toner load amount at the time of factory shipment, and the remaining amount of toner is definite, and hence a method for estimating the remaining amount of toner by using a pixel count with respect to the initial remaining amount of toner can expect high precision at least until the first toner replenishment.

Method for Detecting Print Percentage

As a method for detecting a print percentage in the present embodiment, measurement means (pixel counting) capable of counting the number of pixels where the scanner unit 10 emits light is used. The means for detecting a print percentage may be configured by the control unit 90, or may be provided separately from the control unit 90. Pixel counting is to count individual image signals that form image dots of an image to be formed. FIG. 9B illustrates an example in which print percentage detection means is configured by the control unit 90. Each block illustrated in the control unit in FIG. 9B is configured by a program module, and serves a function in accordance with a program instruction. An image data acquisition unit 98*a* acquires image data to be printed. A pixel count unit 98*b* performs the above-mentioned pixel counting. Then, a print percentage detection unit 98*c* detects a print percentage on the basis of a pixel count value.

As a toner amount required for developing an image, the control unit 90 estimates a toner consumption amount x [%] used by printing of one sheet from the number of pixels where the scanner unit 10 emits light. Specifically, the print percentage is 100% when a solid black image is formed on the entire image formation region (Letter size) on the recording material P, and is 0% when a toner image is not formed on the recording material P at all.

Note that, in the present example, a print percentage detection system using pixel counting is used as the means for detecting a print percentage, but the configuration is not limited thereto. For example, the print percentage may be detected from a detection result of the weight of the developer container at a previous toner replenishment timing, a detection result of the current weight of the developer container, and the number of sheets that has passed between the timings.

Control System in Image Forming Apparatus

Figure 9A:
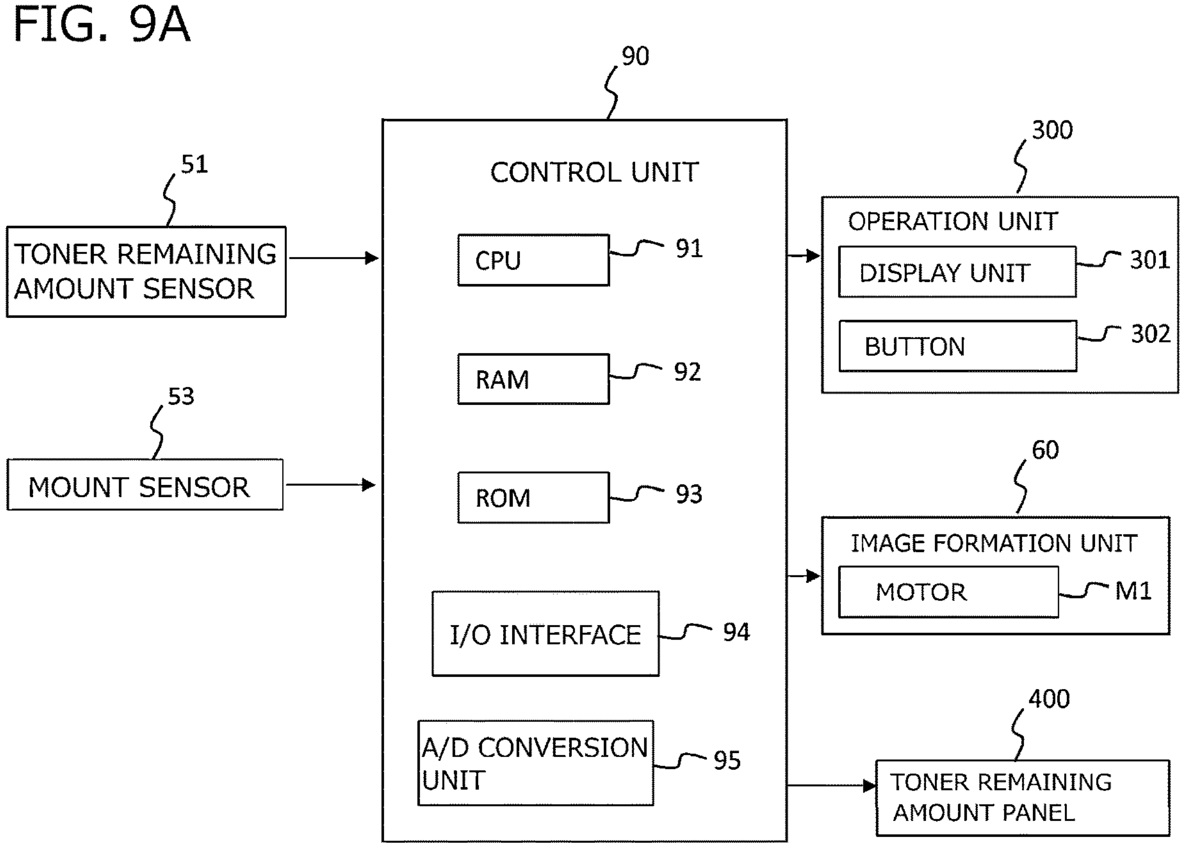
FIGS. 9A and 9B are block diagrams illustrating a control system in the image forming apparatus.
Figure 9B:
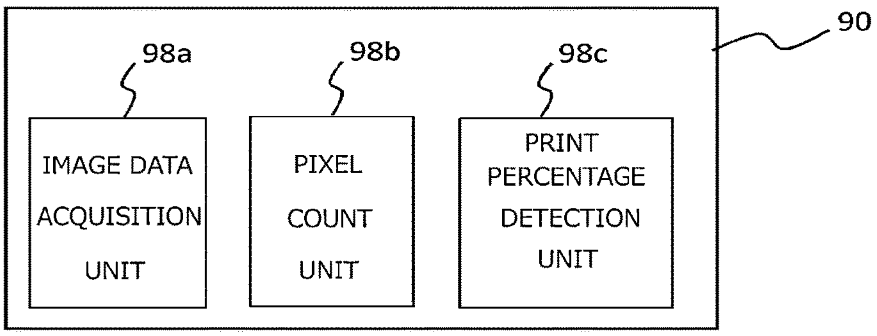

FIG. 9A is a block diagram illustrating a control system in the image forming apparatus 100. A control unit 90 as control means for the image forming apparatus 100 has a CPU 91 as an arithmetic device, a RAM 92 used as a work area for the CPU 91, and a ROM 93 having various kinds of programs stored therein. Furthermore, the control unit 90 has an I/O interface 94 as an input/output port to be connected to an external apparatus, and an A/D conversion unit 95 for converting an analog signal into a digital signal.

On the input side of the control unit 90, a toner remaining amount sensor 51 and a mount sensor 53 are connected, and the mount sensor 53 detects that the toner pack 40 is mounted to the replenishment port 32*a* of the developer container 8. For example, the mount sensor 53 is configured by a pressure-sensitive switch that is provided at the replenishment port 32*a* and outputs a detection signal when pressed by the protrusion 42 of the toner pack 40.

Furthermore, the control unit 90 is connected with an operation unit 300, an image formation unit 60, and a toner remaining amount panel 400 as a notification unit capable of notifying information on the remaining amount of toner, and the operation unit 300 has a display unit 301 capable of displaying various kinds of setting screens and a physical key (button 302). Note that a button UI on the panel may be used instead of the physical key. The display unit 301 is configured by, for example, a liquid crystal panel. The image formation unit 60 has a motor M1 as a drive source for driving the photosensitive drum 1, the developing roller 4, the supply roller 5, and the stirring member 7. Note that the photosensitive drum 1, the developing roller 4, and the supply roller 5, and the stirring member 7 may be driven by different motors.

Figure 10A:
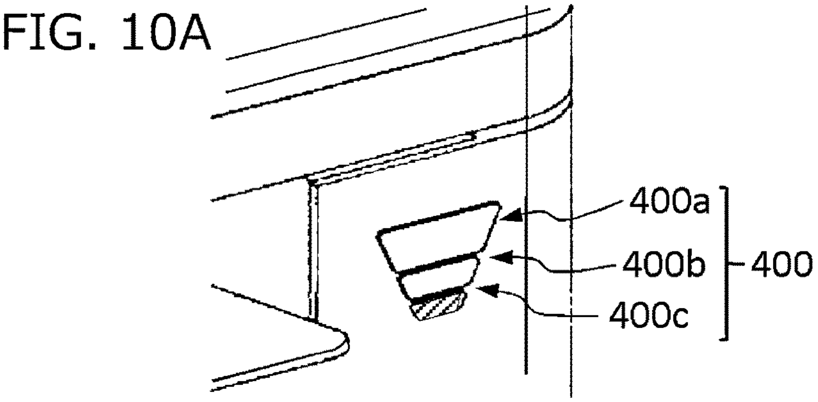
FIGS. 10A to 10C are perspective views illustrating a toner remaining amount level and a toner remaining amount panel.
Figure 10B:
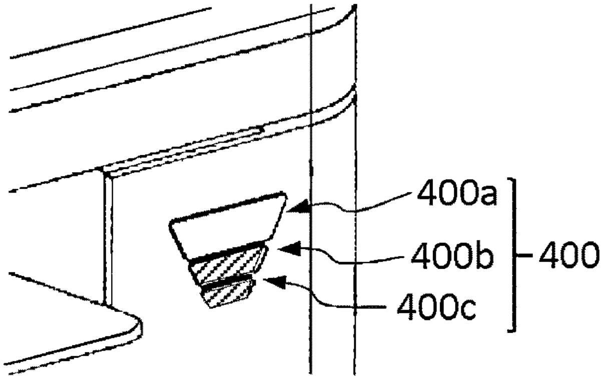
Figure 10C:
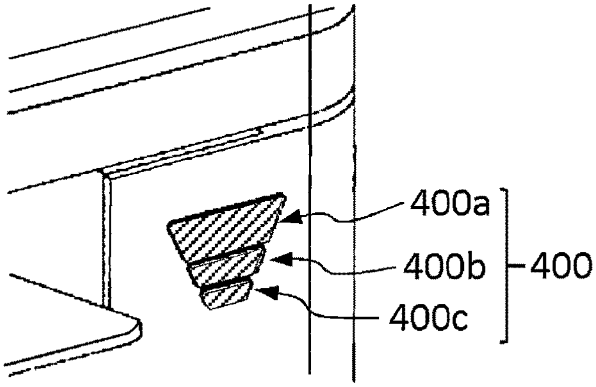

As illustrated in FIGS. 10A to 10C, the toner remaining amount panel 400 is provided at a part of a casing of the apparatus main body M of the image forming apparatus 100. The toner remaining amount panel 400 displays information on the remaining amount of toner in the developer container 8. In the present embodiment, the toner remaining amount panel 400 is a panel member including marks 400*a* to 400*c* as a plurality of (three in this case) indicators arranged side by side in an up-down direction. The mark 400*a* corresponds to Full level for the remaining amount of toner (first state in which remaining amount is large). The mark 400*b* corresponds to Mid level (second state in which remaining amount is intermediate). The mark 400*c* corresponds to Low level (third state in which remaining amount is small). FIG. 10A is a perspective view illustrating the toner remaining amount panel 400 when the remaining amount of toner is Low level (third notification). FIG. 10B is a perspective view of the toner remaining amount panel when the remaining amount of toner is Mid level (second notification). FIG. 10C is a perspective view of the toner remaining amount panel 400 when the remaining amount of toner is Full level (first notification).

Specifically, as illustrated in FIG. 10A, when only the lower mark is turned on in the normal mode, the remaining amount of toner of the developer container 8 indicates Low level. As illustrated in FIG. 10B, when the lower and middle marks are turned on and the upper mark is turned off, the remaining amount of toner in the developer container 8 indicates Mid level. As illustrated in FIG. 10C, when all three marks are turned on, the remaining amount of toner in the developer container 8 indicates Full level. The indication (notification) illustrated in FIG. 10A corresponds to an indication (Low level indication or toner empty indication) when the remaining amount of toner is the largest among indication forms (notification forms) that can be displayed by the toner remaining amount panel 400. The indication illustrated in FIG. 10A enables a user to recognize that toner needs to be replenished.

Furthermore, in a low-consumption support mode (second mode) that assumes usage by a user with small toner consumption, the indications by the marks 400*a* to 400*c* can be performed in an order different from that in the normal mode (first mode). For example, as the consumption of developer progresses, the indication may be advanced from Full level illustrated in FIG. 10C directly to Low level illustrated in FIG. 10A without using the state in FIG. 10B. The residual toner amount at a switching timing from Full level to Low level in the low-consumption support mode is the same as the residual toner amount at a switching timing from Full level to Mid level in the normal mode. Thus, in the low-consumption support mode, Low level is indicated in a state in which a larger amount of toner remains as compared to the normal mode. In other words, a user is prompted for toner replenishment earlier than in the normal mode, and hence the proportion of newly replenished toner to toner in the developer container 8 after replenishment (newly replenished developer ratio) becomes smaller than in the normal mode. Thus, toner is replenished at an early timing, and hence the progress of toner deterioration due to repetition of rubbing of the same toner can be reduced. Note that, if the timing (remaining amount of toner) at which Low level is indicated in the low-consumption support mode is earlier than the timing at which Low level is indicated in the normal mode, an effect to prompt a user for early toner replenishment can be obtained.

Furthermore, other variations may be provided to the marks 400*a* to 400*c* as indicators in the low-consumption support mode. For example, as a variation, the initial state in the low consumption mode may be set to Mid level illustrated in FIG. 10B, and the indication may transition to Low level illustrated in FIG. 10C as the consumption of developer progresses. As another variation, the indication may transition from Full level illustrated in FIG. 10C to Mid level illustrated in FIG. 10B as the consumption of developer progresses, without transitioning to Low level illustrated in FIG. 10C. In this case, a user is prompted for replenishment in the state in FIG. 10B in the low consumption mode. In any case, in the low consumption mode, a user is notified of the need of toner replenishment earlier than in the normal mode.

Toner Replenishment Processing

Figure 11:
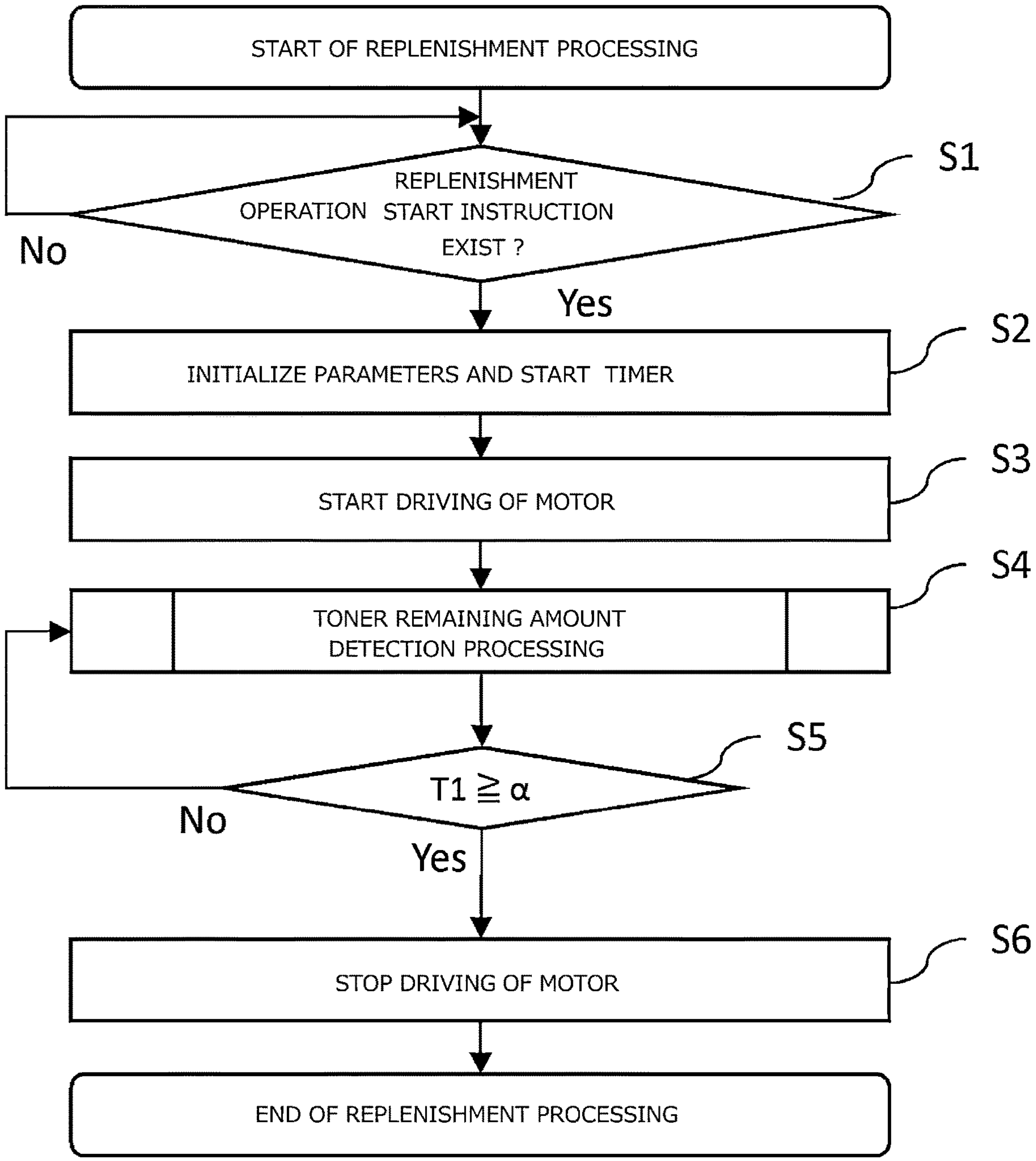
FIG. 11 is a flowchart illustrating toner replenishment processing.

Next, toner replenishment processing in which a user replenishes the developer container 8 with toner in the toner pack 40 is discussed. As illustrated in a flowchart in FIG. 11, when the toner replenishment processing starts, the control unit 90 determines whether a replenishment operation start instruction has been made (Step S1). In the present embodiment, the replenishment operation start instruction is an operation of the user with the operation unit 300. Specifically, when the user operates the operation unit 300 and pushes and operates the button 302 under a state in which a message to prompt operation of the button 302 is displayed on the display unit 301, the replenishment operation start instruction is output.

Note that the replenishment operation start instruction is not limited to the pushing operation of the button 302, and the replenishment operation start instruction may be output in response to a touch operation on the display unit 301 or when the mount sensor 53 detects that the toner pack 40 is mounted to the replenishment port 32*a*. Furthermore, a sensor for detecting that the shutter member 41 of the toner pack 40 is opened may be provided, and a replenishment operation start instruction may be output on the basis of a detection result of the sensor. Furthermore, the replenishment operation may be started in response to an operation input from an external apparatus such as a PC or a workstation.

When it is determined that a replenishment operation start instruction has been made (Yes in Step S1), the control unit 90 initializes parameters of timers T1 and T2 described later to initial values (for example, zero) and starts the timers T1 and T2 (Step S2). Then, the control unit 90 drives the motor M1 (Step S3) to rotate the stir member 7.

Figure 12:
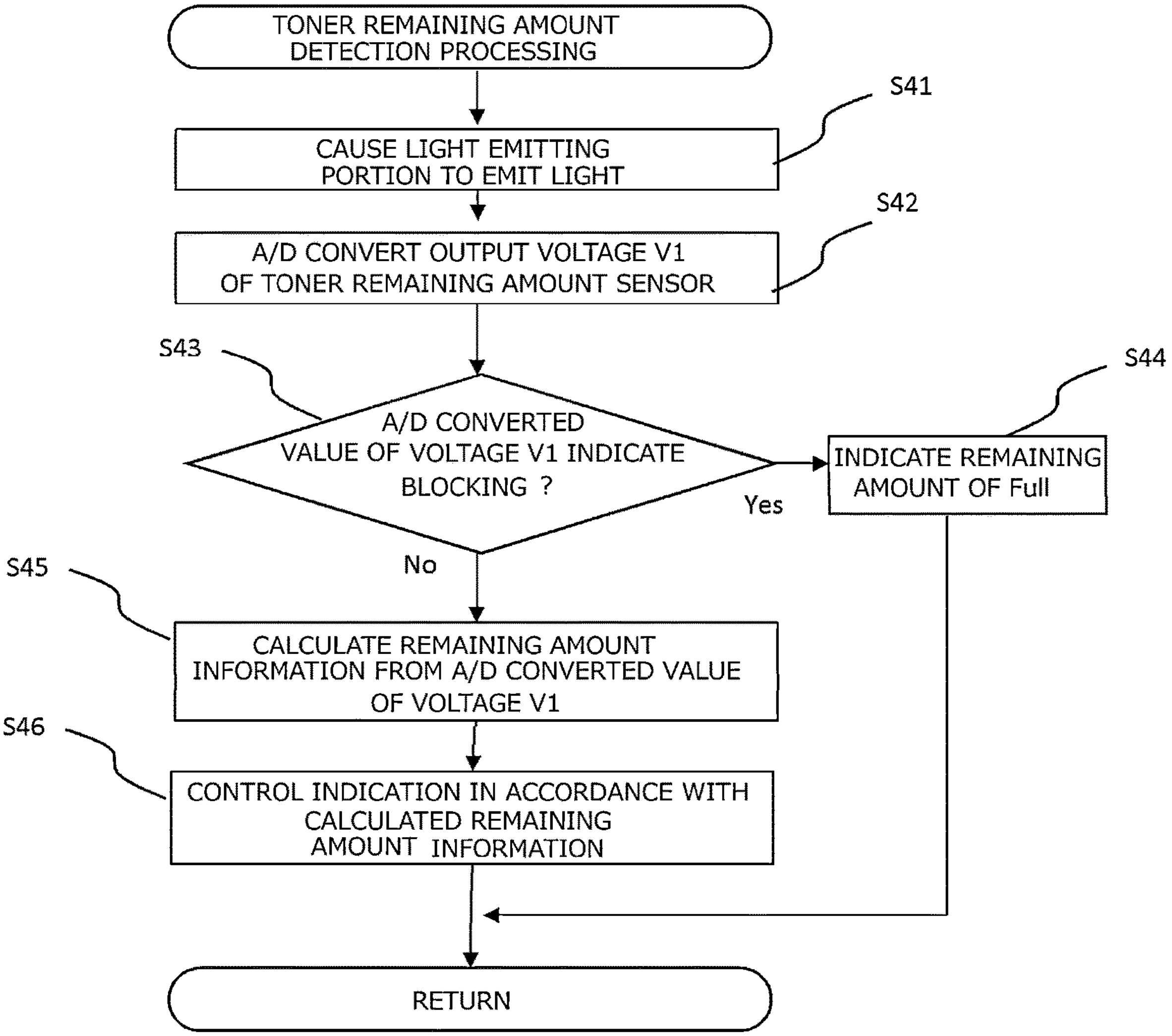
FIG. 12 is a flowchart illustrating toner remaining amount detection processing.

Next, the control unit 90 executes toner remaining amount detection processing (Step S4). The toner remaining amount detection processing is described with reference to a flow of a subroutine in FIG. 12. First, the control unit 90 controls the light emitting portion 51*a* in the toner remaining amount sensor 51 to emit light (Step S41). Then, the control unit 90 controls the A/D conversion unit 95 to convert a voltage V1 output by the light receiving portion 51*b* in the toner remaining amount sensor 51 into a digital signal (hereinafter referred to as "A/D converted value) (Step S42). Note that, in order to improve calculation precision, it is also preferred that the processing in Steps S41 and S42 be repeated a plurality of times (for example, five) and an average value be calculated and output as an A/D converted value.

Next, the control unit 90 determines whether the A/D converted value of the voltage V1 indicates that light in the optical path Q1 is blocked (Step S43). Whether light in the optical path Q1 is blocked is determined by whether light reception time t falls below a threshold. Note that the determination as to whether light in the optical path Q1 is blocked may be based on whether the A/D converted value exceeds a threshold. When the A/D converted value indicates that light in the optical path Q1 is blocked (Yes in Step S43), the control unit 90 controls the toner remaining amount panel 400 to indicate that the remaining amount of toner is Full level (Step S44). Specifically, as illustrated in FIG. 10C, all three marks of the toner remaining amount panel 400 are turned on.

On the other hand, when the A/D converted value of the voltage V1 does not indicate that light in the optical path Q1 is blocked (No in Step S43), the control unit 90 calculates remaining amount information on toner in the developer container 8 on the basis of the A/D converted value of the voltage V1 (Step S45). Then, the control unit 90 controls, on the basis of the calculated remaining amount information on toner, the toner remaining amount panel 400 to indicate that the remaining amount of toner is Low level or Mid level (Step S46). When Step S44 or Step S46 is completed, the toner remaining amount detection processing is finished. Specifically, the toner remaining amount sensor 51 as detection means outputs remaining amount information corresponding to an amount of developer that has been housed in the developer container 8 during the operation of the stirring member 7.

The description continues with reference back to FIG. 11. The control unit 90 determines whether the timer T1 is equal to or more than a threshold α (Step S5). The threshold α is a value set in advance, and corresponds to a driving time for the motor M1 and the stirring member 7 in the toner replenishment processing. When the timer T1 is less than the threshold α (No in Step S5), the flow returns to Step S4, and the remaining amount detection processing is executed again. When the timer T1 is equal to or more than the threshold α (Yes in Step S5), the control unit 90 stops the driving of the motor M1 (Step S6), and finishes the toner replenishment processing. For example, when the threshold α is set to 60 seconds, a time period from Step S3 at which the driving of the motor M1 is started to Step S8 at which the motor M1 is stopped is 60 seconds.

Figure 14A:
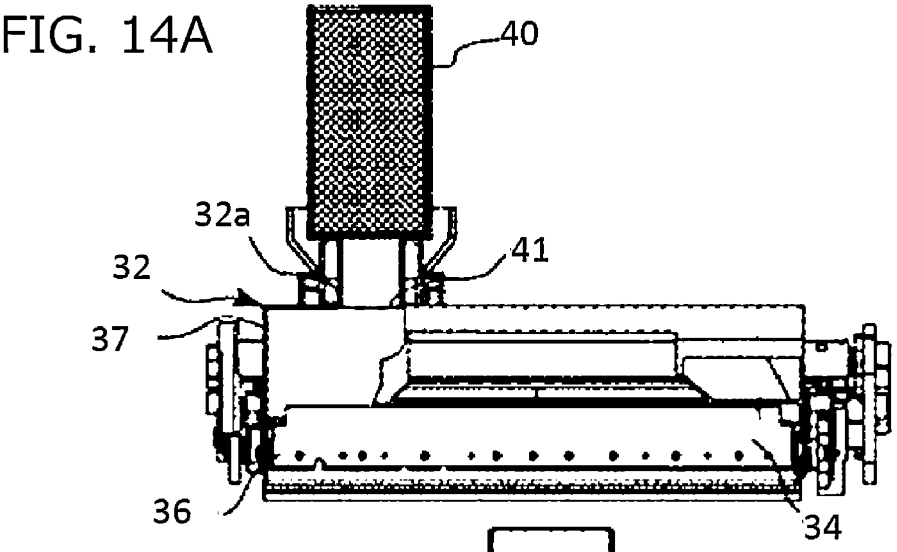
FIGS. 14A to 14C are cross-sectional views illustrating replenishment of toner from a toner pack.
Figure 14B:
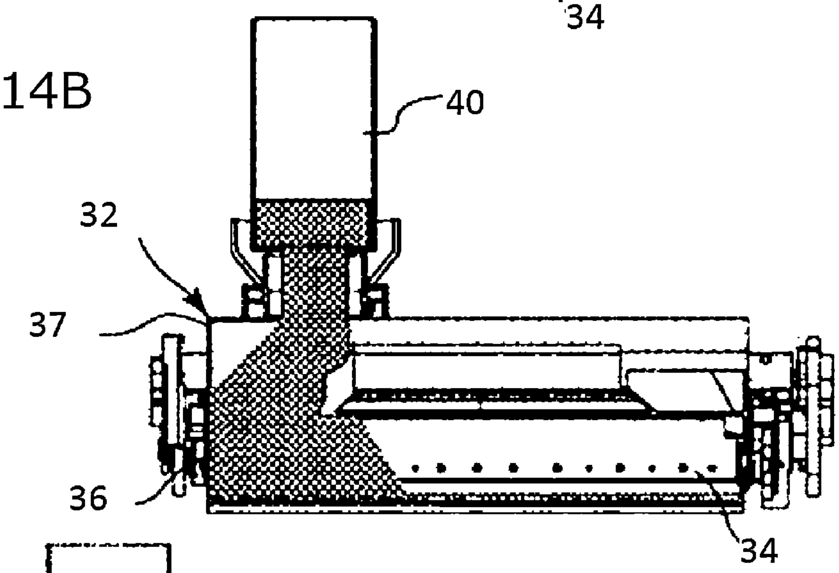
Figure 14C:
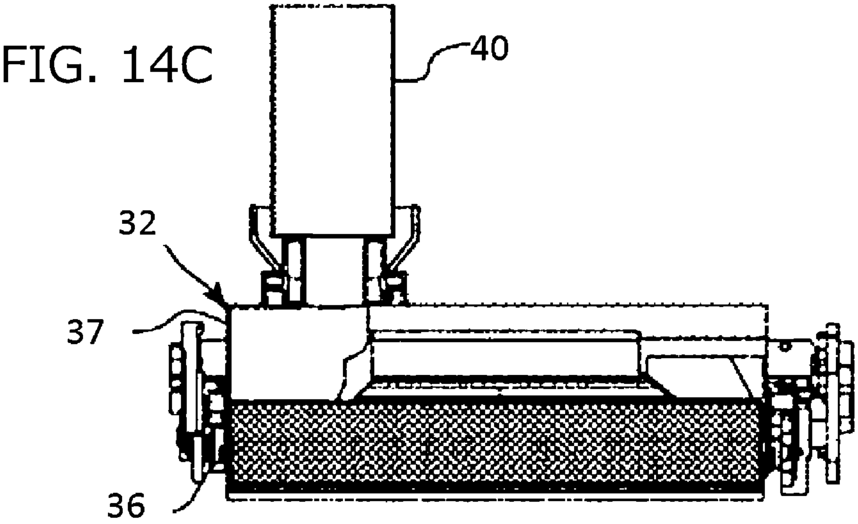

The motions of toner during toner replenishment are illustrated in FIGS. 14A to 14C. The cross-sectional views in FIGS. 14A to 14C indicate the cross-section taken along the line 16A-16A in FIGS. 3A and 3B. FIG. 14A illustrates a state in which the toner pack 40 is mounted to the replenishment port, FIG. 14B illustrates a state in which toner starts to drop from the toner pack 40, and FIG. 14C illustrates a state in which all toner in the toner pack 40 has been replenished.

In the above-mentioned toner replenishment processing, when toner drops into the developer container 8 from the toner pack 40 as illustrated in FIG. 14A, the toner enters the accommodation chamber 8*a* through the base portion 37. The replenishment port 32*a* and the base portion 37 are disposed at one end portion of the developer container 8 in the longitudinal direction, and hence the toner is supplied to the accommodation chamber 8*a* on one end portion side collectively.

A case where the stirring member 7 is not rotated when toner is supplied to the accommodation chamber 8*a* is considered. When toner is caused to drop into the developer container 8 from the toner pack 40, if the stirring member 7 is not rotated in the accommodation chamber 8*a* for housing the toner therein, it takes time for the dropped toner to spread over the longitudinal range of the photosensitive drum 1. If the time increases, it takes a time for a user who performs toner replenishment work to confirm that toner has been replenished in the accommodation chamber 8*a*, which reduces usability.

In view of the above, in the present embodiment, in the toner replenishment processing, the stirring member 7 is driven for a predetermined time (threshold α) from the start of replenishment. In this manner, as illustrated in FIGS. 14B and 14C, toner that has been supplied from the toner pack 40 to one end portion of the developer container 8 is early uniformed by the stirring member 7 over the entire length of the accommodation chamber 8*a* of the developer container 8 in the longitudinal direction. Thus, the time period for a user to confirm that toner has been replenished is shortened, which can improve usability. The toner accommodated in the developer container 8 is uniformed, and hence the precision of detection of remaining amount information on toner by the toner remaining amount sensor 51 can be improved.

Then, during the toner replenishment processing, remaining amount information on toner in the developer container 8 is detected by the toner remaining amount sensor 51 at every predetermined time. For example, as illustrated in FIG. 10A, in a state in which the toner remaining amount panel 400 indicates that the remaining amount of toner is Low level, a user replenishes the developer container 8 with toner from the toner pack 40.

Then, after the toner remaining amount panel 400 indicates that the remaining amount of toner is Mid level as illustrated in FIG. 10B, the toner remaining amount panel 400 indicates that the remaining amount of toner is Full level as illustrated in FIG. 10C. In this manner, the user can reliably recognize that the developer container 8 has been replenished with toner from the toner pack 40, which can improve usability.

In some cases, a sensor may be disposed immediately under the replenishment port 32*a*. In such cases, as illustrated in FIG. 14B, replenished toner may be unbalanced to the left side, and it may take time until toner agent surfaces are uniformed in the entire longitudinal range of the photosensitive drum 1. To detect an accurate toner replenishment state, the toner agent surfaces need to be uniformed in the entire longitudinal range of the photosensitive drum 1. In such a case, however, in the present example, the toner agent surfaces are uniformed in the entire longitudinal range of the photosensitive drum 1 in a short period of time owing to the rotation of the stirring member 7 during the replenishment of toner, which can improve usability.

Example 2

Also in the present example, as operation modes of the image forming apparatus 100, a low-consumption support mode that assumes usage by a user with small toner consumption is prepared in addition to the normal mode. In this case, both in the normal mode and in the low-consumption support mode, notifications are performed in the order of Full level indication in FIG. 10C, Mid level indication in FIG. 10B, and Low level indication in FIG. 10C. Then, in the low-consumption support mode, at a time point of A [g] where the remaining amount of toner is larger than in the normal mode, Low state for prompting the user for toner replenishment is indicated. In the normal mode, on the other hand, when the remaining amount of toner reaches B [g], the indication on the toner remaining amount panel 400 is switched to Low to prompt toner replenishment. In this case, A>B is established. In other words, when the remaining amount of toner with which Low level is indicated in the normal mode is referred to as "first remaining amount" and the remaining amount of toner with which Low level is indicated in the low consumption mode is referred to as "second remaining amount", the second remaining amount is larger than the first remaining amount. Thus, in the low consumption mode, a user is prompted for toner replenishment under a state in which a larger amount of toner than in the normal mode remains.

FIGS. 15A and 15B illustrate relations between the number of prints P [sheets] and the remaining amount of toner T [g] in the normal mode and the low-consumption support mode, respectively. Downward black triangles (Pn, Pw) indicate toner replenishment timings. In a new developer container 8, toner of $T_0$ [g] is contained, and the remaining amount of toner gradually decreases as the number of prints increases.

In the case of the normal mode, when the remaining amount of toner reaches B [g], the indication on the toner remaining amount panel 400 is switched to Low to prompt toner replenishment. When toner is replenished, the remaining amount of toner increases again to $T_0$ [g], and decreases again. After that, the consumption and the replenishment are repeated. On the other hand, in the case of the low-consumption support mode, at a time point at which the remaining amount of toner reaches A [g], the indication on the toner remaining amount panel 400 is switched to Low to prompt toner replenishment. When toner is replenished, the remaining amount of toner becomes larger than $T_0$ [g], and after that, the consumption and the replenishment are repeated.

Figure 13:
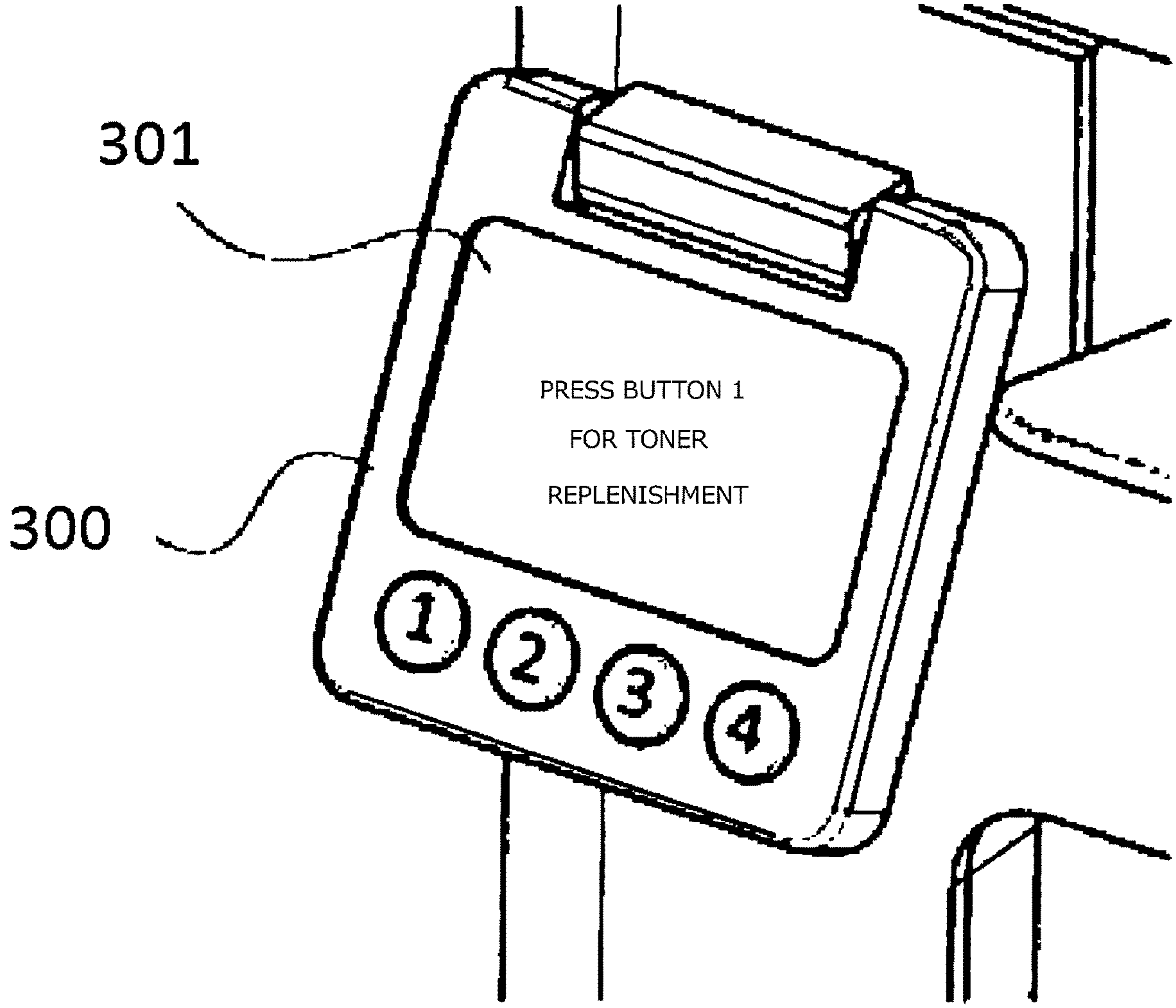
FIG. 13 is a perspective view illustrating an operation unit.

As shown in Table 1, the relation between the remaining amount of toner and the toner remaining amount panel 400 changes in the modes. Whether a user uses the low-consumption support mode or the normal mode can be selected by the user him/herself from the operation panel as illustrated in FIG. 13 or a printer setting screen on a personal computer connected to the printer immediately after the main body is installed.

Table 1 indicates a relation between the toner remaining amount T and the toner remaining amount panel in each mode (in the table, A>B).

TABLE 1

| | Indication on toner remaining amount panel 400 | | |
|---|---|---|---|
| | Low | Mid | Full |
| Normal mode | T < B | B ≤ T < Bm | Bm ≤ T |
| Low-consumption support mode | T < A | A ≤ T < Bm | Bm ≤ T |

The usage with small toner consumption as used herein means that toner consumption is small with respect to the number of prints and the number of rotations of the developing roller 4. For example, a user who frequently prints small-size paper such as A5 size uses a smaller printing area of paper than a user who uses standard A4 paper, and hence the amount of toner consumption per sheet tends to be small. Even in users for A4 paper, a user who continuously prints images of an extremely low print percentage (for example, answer sections in test and questionnaire) corresponds to a user with small toner consumption.

Evaluation Method

In the present example, a duration test was performed in two modes of the normal mode and the low-consumption support mode, and the number of prints where image fogging due to toner deterioration occurs was evaluated. In the case of the normal mode, a duration test was performed for images with a print percentage of 2.5% of A4 paper. Toner was replenished at a timing at which the remaining amount of toner was determined to be Low. The duration was continued until 50,000 (50 k) prints corresponding to the regular lifetime of the main body, and the presence/absence of occurrent of fogging was checked.

In the case of the low-consumption support mode, a duration test was performed for images with a print percentage of 2.5% of A5 paper. The print percentage is 1.25% in terms of A4 paper. In the present example, the print percentage converted with reference to A4 size is defined as "print percentage". Because the paper size is half the size of A4 paper, the amount of toner consumption is half with the same print percentage. Toner was replenished at a timing at which the remaining amount of toner was determined to be Low. The duration was continued until 50,000 prints corresponding to the regular lifetime of the main body, and the presence/absence of occurrence of fogging was checked. The evaluation was performed under environments with a temperature of 15° C. and a humidity of 10%.

Fogging was measured by using a reflection densitometer (Model TC-MOR-45, green filter manufactured by Tokyo-Denshoku.co., Ltd.) to measure the reflectivity (%). As a determination criteria for toner fogging, x (fogging occurred) was determined when fogging with a reflectivity of 5% or more occurred on paper during duration, and ○ (no fogging) was determined in other cases. In the measurement of fogging, Post-it (registered trademark) was attached to a part of a sheet to be printed, and plain image formation was performed and the sheet was output. Then, the reflectivity at a part of the output sheet where the attached Post-it was removed was used as reference reflectivity of paper itself, and fogging was measured. The reflectivity was different depending on measurement parts, and hence the measurement was performed for a sufficient number of a plurality of parts, and a difference between a measured value at a part where the value was minimum and a measured value at a part where Post-it was attached (reference reflectivity) was calculated as a fogging value. A smaller value of the measured fogging value indicates a smaller fogging amount, which means that image quality is satisfactory.

The results are shown in Table 2. In the present example, both in A4 paper duration performed in the normal duration mode and in A5 paper duration performed in the low-consumption support mode, 50 k prints corresponding to the lifetime of the main body was reached without causing fogging with a reflectivity of 5% or more. Furthermore, the number of prints until the first toner replenishment notification is 6,500 in A4 paper duration and in A5 paper duration, which exceeds 5,000 as the expected number of prints.

Table 2 indicates duration evaluation results in Example and Comparative Examples.

TABLE 2

| | Evaluation of fogging | | Number of prints until first replenishment | |
|---|---|---|---|---|
| | A4 paper normal duration | A5 paper low consumption duration | A4 paper normal duration | A5 paper low consumption duration |
| Example | ○ (Normal mode) | ○ (Low-consumption support mode) | 6500 | 6500 |
| Comparative Example1 | ○ (Normal mode) | X at 12,000 prints (Normal mode) | 6500 | 12,000 or more |
| Comparative Example2 | ○ (Low- | ○ (Low- | 3500 | 6500 |

TABLE 2-continued

| Evaluation of fogging | | Number of prints until first replenishment | |
|---|---|---|---|
| A4 paper normal duration | A5 paper low consumption duration | A4 paper normal duration | A5 paper low consumption duration |
| consumption support mode) | consumption support mode) | | |

Comparative Example 1

In Comparative Example 1, both of A4 paper duration and A5 paper duration were performed in the normal mode. Other conditions are all the same as in Example 1. The results are added in Table 2.

In Comparative Example 1, in A4 paper duration, fogging did not occur and the lifetime of the main body was reached, but in A5 paper duration, fogging with a reflectivity 5% or more occurred at 12,000 prints before the first toner replenishment was reached. The duration evaluation was finished at this time point.

Comparative Example 2

In Comparative Example 2, both of A4 paper duration and A5 paper duration were performed in the low-consumption support mode. The results are added in Table 2. In both cases, the number of prints reached 50 k corresponding to the lifetime of the main body without causing fogging with a reflectivity of 5% or more. In normal duration for A4 paper, however, the number of prints until the first toner replenishment notification was 3,500, which was smaller than 5,000 as the expected number of prints.

The above result is discussed. Rubbing and deterioration of toner in the developing apparatus 20 are considered. Toner on the developing roller 4 that has been rubbed by the developing blade 6 and has not been developed at the developing portion N3 is once stripped by the supply roller 5 and collected in the developer container 8. On the other hand, in contrast, another toner is supplied onto the developing roller 4 by the supply roller 5, and toner is coated on the developing roller 4 while being rubbed and charged by the developing blade 6.

In the case of A4 paper duration, the amount of toner consumption per sheet is larger than that in A5 paper duration, and the proportion by which toner that has been once rubbed by the developing blade 6 is developed onto the photosensitive drum 1 and discharged to the outside from the developing apparatus 20 is larger than that in A5 paper duration. In the case of A5 paper duration, on the other hand, the amount of toner consumption per sheet is small, and hence most of toner on the developing roller 4 that has been rubbed is not consumed. The toner is stripped from the developing roller 4 by the supply roller 5, but remains in the developer container 8. After that, as the duration progresses, operation in which toner that has rubbed once is supplied onto the developing roller 4 again by the supply roller 5, is rubbed by the developing blade 6, and is stripped by a collection roller is repeated. As a result, as compared to normal duration for A4, toner deterioration progresses faster with respect to the number of prints. In particular, toner deteriorates most at a timing when the amount of toner in the developer container 8 decreases and immediately before new toner is replenished, and the risk of occurrence of fogging increases. In contrast, if the amount of toner in the developer container 8 is large, the probability by which toner that has been rubbed once is coated onto the developing roller 4 again and rubbed is reduced and thus the progress of deterioration is suppressed, which is advantageous.

The toner deterioration as used herein refers to a state in which toner is deformed by rubbing load or an external additive is embedded in a toner base so that the toner loses its function and the flowability and charging performance of toner are lost or an attachment force with respect to each member increases. When the toner deterioration progresses, the amount of charges of toner decreases (or charging polarity is reversed), and a force of controlling the toner by electric field decreases. Furthermore, when the toner deterioration progresses, an attachment force of toner with respect to the photosensitive drum 1 increases, and hence toner adheres to a part of the photosensitive drum on which no latent image has been formed, which causes the occurrent of fogging. Toner with an increased attachment force is apt to adhere to the charging roller 2, which decreases the charging performance of the charging roller 2 and reduces the potential of the surface of the photosensitive drum 1. This also increases the risk of the occurrence of fogging.

In Example 2, in A5 paper duration where toner deterioration is apt to progress, the duration was performed in the low-consumption support mode, and hence new toner is replenished in a state in which the remaining amount of toner in the developer container 8 is large, that is, a state before the degree of toner deterioration becomes too large. In this manner, by controlling the degree of toner deterioration in the developer container 8 not to be equal to or more than a given value, toner fogging can be suppressed. Furthermore, the whole toner amount is large after toner replenishment, and hence the probability by which the same toner continuously receives rubbing load on the developing roller 4 decreases, and the progress of toner deterioration becomes slow. Furthermore, the amount of toner consumption is small, and hence the number of prints until the first replenishment can be secured.

In Example 1, on the other hand, in A4 paper duration where toner consumption is large, toner deterioration with the remaining toner amount B [g] in the normal mode is within a tolerable range, and the number of prints until the first replenishment can be secured.

A5 paper duration in Comparative Example 1 was performed in the normal mode, and hence the number of times of toner rubbing increased and toner deterioration progressed, and hence fogging due to toner deterioration occurred before the remaining toner amount reached B [g] (before first replenishment).

In Comparative Example 2, both durations were performed in the low-consumption support mode, and hence no fogging due to toner deterioration occurred. However, toner was replenished at a time point of A [g] where the remaining amount of toner was larger than in the normal mode, and hence the number of prints until the first toner replenishment was as small as 3,500. As a method for solving this problem, a method for increasing the toner load amount to be larger than the current $T_0$ [g] from the beginning is conceivable, which, however, increases the cost of the entire apparatus.

From the above results, it is considered that the form in the example where both A4 duration and A5 duration can be supported by a necessary and sufficient toner amount and substantially the same predetermined number of sheets can be printed is superior. Thus, it is found that, only in Example 1 where two modes of the normal mode and the low consumption mode are provided and switched depending on duration conditions, fogging due to toner deterioration does not occur, and a desired number of sheets can be printed. In other words, in the present invention, in a mode for printing with a low print percentage, the indication on the toner remaining amount panel 400 can be changed to prompt the replenishment at an appropriate timing. As a result, toner deterioration can be decreased to reduce the occurrence of image adverse effect such as toner fogging caused by toner deterioration.

Example 3

In the above-mentioned examples, an example in which a user his/herself selects a normal mode or a low consumption mode has been described. In the present example, an example in which the apparatus automatically determines whether a normal mode or a low consumption mode is appropriate and switches the mode is described. Note that descriptions of configurations and operations common to Example 1 are omitted.

In the present example, an average value of print percentages of images printed by a user from the initial state is used for the determination of the operation mode. As the print percentage, a print percentage in terms of A4 paper is used. In other words, a print percentage of 2.5% for A5 paper is 1.25% in terms of A4 paper.

Figure 16:
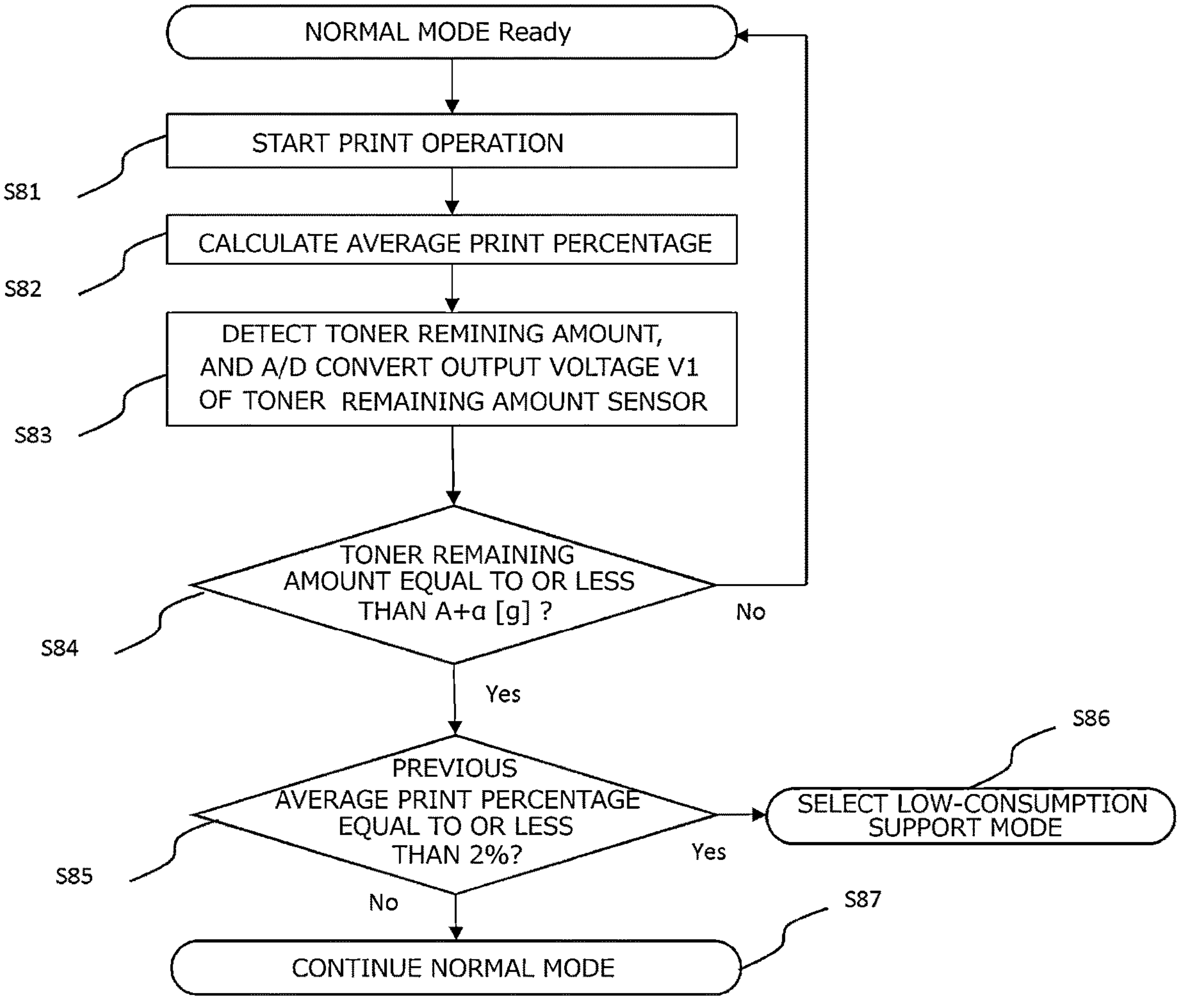
FIG. 16 is a flowchart for determining switching to each mode according to Example 2.

FIG. 16 illustrates a determination flowchart. When a print operation is started (Step S81) and the number of prints exceeds a predetermined number, the control unit 90 calculates an average print percentage of the past prints (Step S82). The average print percentage is typically calculated by calculating an average value of print percentages at a time point when a predetermined number of sheets are printed. Note that, in the case where toner is replenished after printing with a high print percentage is continued and then images with a low print percentage are continued, the probability that the average print percentage is determined to be equal to or less than a threshold is low. Also in such a case, control that enables the setting to the low-consumption support mode may be performed. For example, when the previous average print percentage exceeds a predetermined value (for example, 10%), a method in which the average print percentage is always reset or a method in which a print percentage exceeding a predetermined value is not employed for the calculation of the average print percentage but a small print percentage is employed may be employed.

The operation mode is controlled to the normal mode from the start of use of the apparatus until determination processing described later. Next, the control unit 90 detects the remaining amount of toner by using the toner remaining amount sensor 51 by the same method as in Example 1, and inputs an output voltage V1 to the A/D conversion unit 95 and calculates the remaining amount of toner on the basis of the input value and the table (Step S83).

Next, the control unit 90 determines whether the remaining amount of toner is equal to or less than A+α [g] (Step S84). In this case, the situation in which "the remaining amount of toner is A+α [g]" indicates that the current remaining amount of toner is slightly larger than the remaining amount of toner A [g], which is the above-mentioned determination criteria in the low-consumption support mode. α[g] can be determined as appropriate, and is, for example, several grams (single-digit gram). When the remaining amount of toner is larger than A+α [g], the flow returns to the first step without changing the mode (Yes in S84).

On the other hand, when the remaining amount of toner is equal to or less than A+α [g] (No in S84), the control unit 90 determines whether an average print percentage at a time when a user performs printing is 2% or less (Step S85). When the average print percentage is 2% or less (Yes in S85), the control unit 90 selects the low-consumption support mode (Step S86). On the other hand, when the average print percentage is more than 2% (No in S85), the control unit 90 continues the normal mode (Step S87). Once the mode is determined, the mode is continued until the lifetime of the main body without any change.

In the present example, in this manner, the mode can be automatically switched to an appropriate mode without selecting the mode by a user him/herself. Duration tests were performed similarly to Example 1. In an A4 paper duration test, the duration progressed in the normal mode, and in an A5 paper duration test, the mode was switched to the low-consumption support mode from 6,000 prints, and similarly to Example 1, the remaining amount panel 400 indicated Low at 6,500 prints, and toner was replenished. The duration test results were the same results as in Example 1.

In the present example, the mode switching determination was performed on the basis of an average print percentage from the initial state until the remaining amount of toner A+α. However, for example, the sections for the average print percentage may be divided by determining an average print percentage of previous 1,000 prints until A+α.

Furthermore, in the present example, the mode that has been once determined is controlled to be the same until the lifetime of the main body, but which of the modes is used may be determined again and the mode may be switched at a time point at which the remaining amount of toner reaches A+α again after toner replenishment.

Modification

Figure 17:
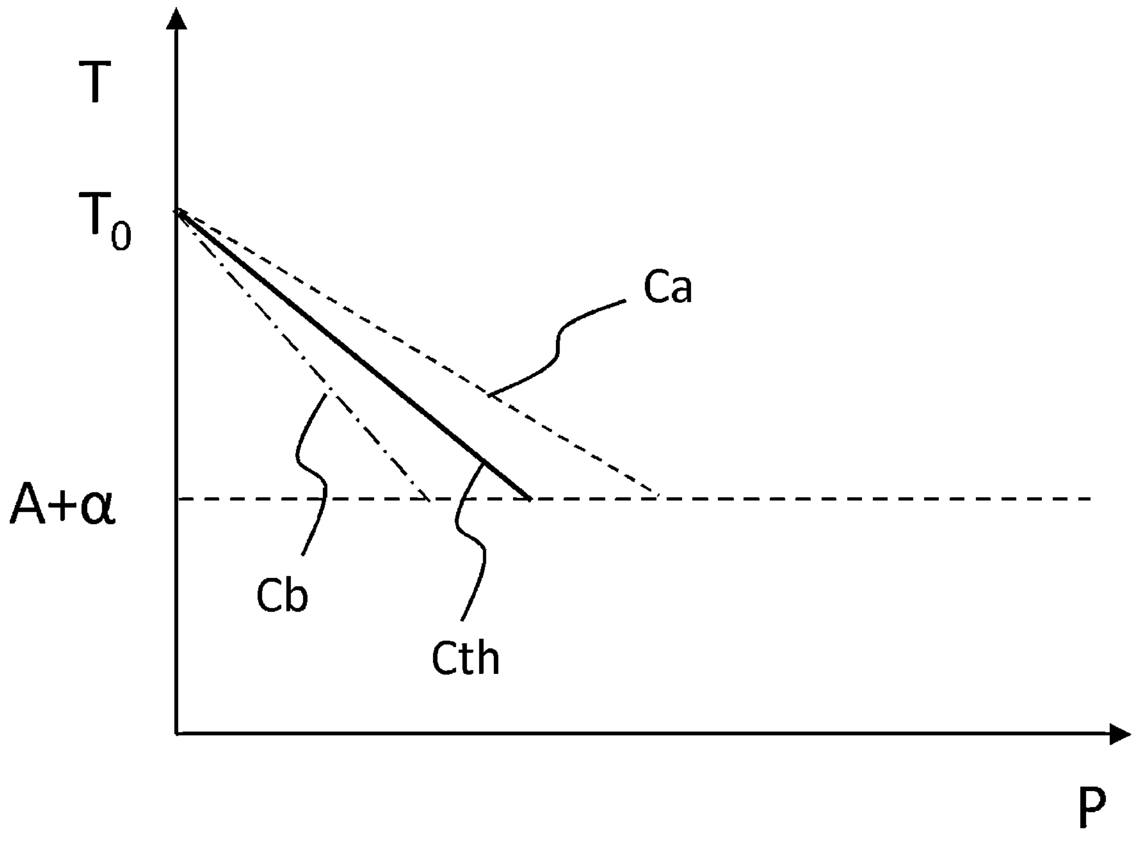
FIG. 17 is a diagram illustrating a modification of Example 2.

As a modification of the mode determination method in the present example, a method illustrated in FIG. 17 may be used. FIG. 17 is a graph in which the horizontal axis represents the number of prints and the vertical axis represents the remaining amount of toner, and illustrates a transition of the remaining amount of toner during printing. In the present modification, the control unit 90 continuously monitors a relation between the number of prints and the remaining amount of toner. Then, when the remaining amount of toner corresponding to the number of prints transitions in a region larger than a predetermined relation indicated by Cth in FIG. 17 (for example, Ca in FIG. 17), the control unit 90 determines that a user uses a small consumption amount of toner, and sets the operation mode to a low-consumption support mode. On the other hand, when the remaining amount of toner transitions in a region lower than Cth (for example, Cb in FIG. 17), the control unit 90 sets the operation mode to a normal mode. The determination is performed when the remaining amount of toner is (A+α) [g] or more. In FIG. 17, the horizontal axis represents the number of prints, but may be a rotation distance of the developing roller 4. The remaining amount of toner may be estimated from the value of the toner remaining amount sensor 51, or may be calculated from pixel counts.

Furthermore, an average print percentage is used as the mode determination method in the present example, but whether a larger number of A4 paper are printed or a larger number of A5 paper are printed may be detected, and the mode may be switched to the normal mode when a larger number of A4 paper are printed and switched to the low consumption mode when a larger number of paper with a size smaller than A4 are printed. As a detection method, a method in which size information on media designated by a user is used, a method in which a paper size is detected from a paper width sensor or a registration sensor provided in a paper transport path, a method in which the size is detected from a light emission time or a light emission region of the scanner unit 10, or a method in which the size is determined from an image size after image processing may be used.

Furthermore, in each example, when use conditions of a user have changed, such as when a user who has printed a large number of A5 paper then prints a large number of A4 paper, the mode can be switched from the low-consumption support mode to the normal mode in the middle. The reverse case is possible.

Furthermore, in each example, two modes of the normal mode and the low-consumption support mode are switched, but three or more modes may be provided and switched depending on print percentages and use conditions.

Furthermore, in each example, the remaining amount of toner is detected from the value of the toner remaining amount sensor, but a method in which a toner consumption amount is calculated from a pixel count value and is subtracted from an initial toner amount $T_0$ to calculate the remaining amount of toner may be used. As long as the amount replenished from the toner pack is constant even after toner replenishment, the remaining amount of toner can be calculated from a pixel count value, and hence control may be performed on the basis of the calculation result.

Furthermore, A [g] in each example may be set as appropriate in consideration of the durability of toner, the assumed printable number of prints, and the initial toner amount $T_0$ [g]. In the examples, as illustrated in FIGS. 15A and 15B, Bm was at substantially the middle between $T_0$ and B, and A [g] was set to an amount slightly smaller than Bm. With this setting, substantially the same number of prints is obtained when images with the same print percentage are printed on A4 paper and A5 paper in the normal mode and in the low-consumption support mode, respectively. This is because the amount of toner consumption for A5 paper is half the amount of toner consumption for A4 paper. However, Bm=A may be set for A [g] used for prompting toner replenishment.

Furthermore, both the method in which a user manually designates a mode as in Example 1 and the method in which the apparatus automatically determines a mode as in Example 2 may be provided. If determinations in the methods conflict, a user may be caused to check on the operation panel, and finally, a mode designated by the user may be used.

Note that the toner remaining amount panel 400 is not limited to a liquid crystal panel, and may be configured by a light source such as an LED or an incandescent lamp and a diffusing lens. Note that, in the example illustrated in FIGS. 10A to 10C, the toner remaining amount panel 400 has been described as a notification unit indicating the remaining amount of toner, but the configuration is not limited thereto. For example, the indication in FIG. 10A may be indication that toner needs to be replenished, the indication in FIG. 10B may be indication that toner does not need to be replenished, and the indication in FIG. 10C may be indication that sufficient toner has been replenished.

Example 4

In the present example, an example in which the remaining amount of toner is different between a normal mode and a low-consumption support mode when Mid level is displayed (second notification) is described. FIG. 18A is a normal mode and FIG. 18B is a low-consumption support mode, each illustrating a relation between the number of prints P [sheets] and the remaining amount of toner T [g]. Downward black triangles (Pn, Pw) indicate toner replenishment timings. In a new developer container 8, toner of $T_0$ [g] is contained, and the remaining amount of toner gradually decreases as the number of prints increases.

In the low-consumption support mode in FIG. 18B, first, when the remaining amount of toner reaches A [g], the indication on the toner remaining amount panel 400 is switched to Mid. In the low-consumption support mode in the present example, toner replenishment is prompted by the indication of Mid level. Thus, toner is replenished at a timing Pw1, and the indication is switched to Full level.

Furthermore, in the present example, when the remaining amount of toner thereafter becomes $T_0$ [g], Mid level is indicated. Specifically, toner replenishment is prompted at every timing Pw, and when toner is replenished, the indication is switched to Full level. With the configuration in the present example, toner replenishment can be prompted at an early timing in the low-consumption support mode so that the occurrence of adverse effect on images due to toner deterioration can be suppressed.

Modification

The contents of notification may be changed from Example 2, with the replenishment timings unchanged from FIG. 15B. For example, when the remaining amount of toner reaches A [g], the indication on the toner remaining amount panel 400 may be set to Mid level. In the low-consumption support mode in the present modification, toner replenishment is prompted by the indication of Mid level. Thus, toner is replenished at a timing Pw, and the indication is switched to Full level.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-137506, filed on Aug. 25, 2023, which is hereby incorporated by reference herein in its entirety.

What is claimed is:

1. An image forming apparatus, comprising:

an accommodation chamber configured to accommodate developer therein;

a photosensitive drum;

a developing roller configured to supply the developer from the accommodation chamber to a surface of the photosensitive drum;

a notification unit configured to make a notification to a user by indication on an indicator; and, a control unit configured to control the notification unit, wherein:

a replenishment container configured to replenish the accommodation chamber with the developer is detachably attached;

the control unit is capable of controlling the image forming apparatus in a first mode and a second mode different from the first mode;

the control unit controls the notification unit to make a first notification indicating that an amount of the developer in the accommodation chamber is a first state, a second notification indicating that the amount of the developer is a second state that is smaller than the amount of the developer in the first state, and a third notification indicating that the amount of the developer is a third state that is smaller than the amount of the developer in the second state and;

the control unit controls the notification unit to make the notifications in an order of the first notification, the second notification, and the third notification in the first mode as consumption of the developer progresses, and makes the notifications in the second mode in an order different from the order in the first mode.

2. The image forming apparatus according to claim 1, wherein the control unit controls the notification unit to make the notifications in an order of the first notification and the third notification in the second mode as the consumption of the developer progresses.

3. The image forming apparatus according to claim 2, wherein the third notification is an indication to prompt the user to replenish the developer.

4. The image forming apparatus according to claim 1, wherein the control unit controls the notification unit to make the notifications in an order of the first notification and the second notification in the second mode as the consumption of the developer progresses.

5. The image forming apparatus according to claim 1, wherein the control unit controls the notification unit to make the notifications in an order of the second notification and the third notification in the second mode as the consumption of the developer progresses.

6. The image forming apparatus according to claim 1, wherein the second mode is a mode in which consumption of the developer is smaller than in the first mode.

7. The image forming apparatus according to claim 6, wherein the second mode is a mode in which a print percentage in image formation is lower than in the first mode.

8. The image forming apparatus according to claim 7, further comprising detection means for detecting the print percentage on the basis of image data for forming the image, wherein whether the image forming apparatus operates in the first mode or the second mode is determined on the basis of output from the detection means.

9. The image forming apparatus according to claim 6, wherein the second mode is a mode in which a recording material with a size smaller than in the first mode is used.

10. The image forming apparatus according to claim 6, wherein whether the image forming apparatus operates in the first mode or the second mode is determined on the basis of an instruction from a user.

11. The image forming apparatus according to claim 1, wherein, in a case where the developer is replenished from the replenishment container to the accommodation chamber, when a proportion of the developer newly replenished to the accommodation chamber to the developer present in the accommodation chamber is referred to as a newly replenished developer ratio, a newly replenished developer ratio in the first mode is larger than a newly replenished developer ratio in the second mode.

12. The image forming apparatus according to claim 11, wherein, in the first mode and the second mode, the same amount of the developer is replenished by the replenishment container.

13. An image forming apparatus, comprising:

an accommodation chamber configured to accommodate developer therein;

a photosensitive drum;

a developing roller configured to supply the developer from the accommodation chamber to a surface of the photosensitive drum;

a notification unit configured to make a notification to a user by indication on an indicator; and a control unit configured to control the notification unit, wherein:

a replenishment container configured to replenish the accommodation chamber with the developer is detachably attached;

the control unit is capable of controlling the image forming apparatus in a first mode and a second mode different from the first mode;

the control unit controls the notification unit to make a first notification indicating that an amount of the developer in the accommodation chamber is a first state, a second notification indicating that the amount of the developer is a second state that is smaller than the amount of the developer in the first state, and a third notification indicating that the amount of the developer is a third state that is smaller than the amount of the developer in the second state and;

the control unit controls the notification unit to make the second notification when a remaining amount of the developer becomes a first remaining amount in the first mode, and makes the second notification when the remaining amount of the developer becomes a second remaining amount larger than the first remaining amount in the second mode.

* * * * *